US012333249B2

(12) United States Patent
Avadhani et al.

(10) Patent No.: US 12,333,249 B2
(45) Date of Patent: Jun. 17, 2025

(54) MAPPING ENTITIES IN UNSTRUCTURED TEXT DOCUMENTS VIA ENTITY CORRECTION AND ENTITY RESOLUTION

(71) Applicant: OneTrust LLC, Atlanta, GA (US)

(72) Inventors: Madan Avadhani, Palo Alto, CA (US); Siddhartha Kille, Atlanta, GA (US)

(73) Assignee: OneTrust, LLC, Atlanta, GA (US)

( * ) Notice: Subject to any disclaimer, the term of this patent is extended or adjusted under 35 U.S.C. 154(b) by 409 days.

(21) Appl. No.: 17/813,384

(22) Filed: Jul. 19, 2022

(65) Prior Publication Data

US 2023/0267274 A1 Aug. 24, 2023

Related U.S. Application Data

(60) Provisional application No. 63/268,331, filed on Feb. 22, 2022.

(51) Int. Cl.
*G06F 40/284* (2020.01)
*G06F 18/22* (2023.01)
*G06F 40/295* (2020.01)
*G06V 30/32* (2022.01)

(52) U.S. Cl.
CPC ............ *G06F 40/284* (2020.01); *G06F 18/22* (2023.01); *G06F 40/295* (2020.01); *G06V 30/32* (2022.01)

(58) Field of Classification Search
None
See application file for complete search history.

(56) References Cited

U.S. PATENT DOCUMENTS

| | | | | |
|---|---|---|---|---|
| 9,639,518 | B1* | 5/2017 | Goodspeed | G06Q 30/0281 |
| 10,534,782 | B1* | 1/2020 | Gudur | G06F 16/3344 |
| 10,896,292 | B1* | 1/2021 | Norton | G06V 30/12 |
| 12,125,000 | B2* | 10/2024 | Agarwal | H04L 51/42 |
| 2002/0161570 | A1* | 10/2002 | Loofbourrow | G06F 40/284 704/4 |
| 2010/0076972 | A1* | 3/2010 | Baron | G06F 40/295 707/E17.039 |

(Continued)

*Primary Examiner* — Jonathan C Kim
(74) *Attorney, Agent, or Firm* — Ballard Spahr LLP

(57) ABSTRACT

Methods, systems, and non-transitory computer readable storage media are disclosed for correcting entity detection errors with entity correction and resolution in optical character recognition for digitization of physical documents. Specifically, the disclosed system utilizes named entity recognition to extract entities from character strings (e.g., words) in a digital text document. The disclosed system also tokenizes the character strings in the digital text document based on attributes of the character strings. Furthermore, the disclosed system compares the extracted entities and tokenized character strings to determine similarity metrics between the extracted entities and tokenized character strings. The disclosed system also compares extracted entities to character strings including special/numerical characters to determine similarity metrics indicating correlation probabilities between entities and character strings. The disclosed systems generate mappings between the tokens and entities based on the similarity metrics to resolve entities to likely corresponding character strings while correcting for errors during entity extraction.

20 Claims, 16 Drawing Sheets

(56) References Cited

U.S. PATENT DOCUMENTS

| | | | |
|---|---|---|---|
| 2013/0262089 A1* | 10/2013 | Whitman | G06F 16/93 |
| | | | 704/9 |
| 2015/0254327 A1* | 9/2015 | Patil | G06F 16/9024 |
| | | | 707/739 |
| 2017/0060837 A1* | 3/2017 | Dusberger | G06F 16/313 |
| 2017/0364502 A1* | 12/2017 | Ganesalingam | G06F 40/274 |
| 2020/0142930 A1* | 5/2020 | Wang | G06F 18/23213 |
| 2020/0152188 A1* | 5/2020 | Lee | G10L 15/22 |
| 2020/0327136 A1* | 10/2020 | Gao | G06Q 10/06 |
| 2020/0334381 A1* | 10/2020 | Yarowsky | G06F 40/166 |
| 2021/0200795 A1* | 7/2021 | Upadhyay | G06F 40/295 |
| 2021/0271824 A1* | 9/2021 | Pham | G06F 40/295 |
| 2021/0342654 A1* | 11/2021 | Garg | G06N 5/04 |
| 2022/0100742 A1* | 3/2022 | Viswanathan | G06F 40/30 |
| 2022/0222277 A1* | 7/2022 | Pasumarthy | G06F 16/951 |
| 2022/0374602 A1* | 11/2022 | Park | G06F 40/295 |
| 2023/0038793 A1* | 2/2023 | Agarwal | H04L 51/212 |
| 2023/0044266 A1* | 2/2023 | Nguyen | G06F 16/90335 |
| 2023/0092447 A1* | 3/2023 | Solmaz | G06V 30/19093 |
| | | | 704/9 |
| 2023/0267274 A1* | 8/2023 | Avadhani | G06F 18/22 |
| | | | 704/243 |
| 2023/0376542 A1* | 11/2023 | Avadhani | G06F 16/325 |

* cited by examiner

| A | Last Letter | Position |
|---|---|---|
| A | a | 506 |
| A | a | 768 |
| An | n | 234 |
| All | l | 3 |
| American | n | 67 |
| And | d | 23 |

600a

| I | Last Letter | Position |
|---|---|---|
| Illinois | s | 456 |
| I1inois | s | 235 |

600b

| J | Last Letter | Position |
|---|---|---|
| John | n | 434 |
| J0hn | n | 7634 |

600c 602
604

| S | Last Letter | Position |
|---|---|---|
| Shall | l | 567 |
| Settle | e | 342 |
| Such | h | 63 |
| School | l | 5102 |
| Smith | h | 534 |
| Sm!th | h | 875 |
| Sm1th | h | 654 |

600d

| ! | Last Letter | Position |
|---|---|---|
| !llinois | s | 9867 |
| !llin0is | s | 656 |

MAPPING ENTITIES IN UNSTRUCTURED TEXT DOCUMENTS VIA ENTITY CORRECTION AND ENTITY RESOLUTION

CROSS-REFERENCE TO RELATED APPLICATIONS

This application claims the benefit of, and priority to, U.S. Provisional Patent Application No. 63/268,331 filed Feb. 22, 2022. The entire contents of the foregoing patent applications are hereby incorporated by reference.

BACKGROUND

Advances in computer processing and data storage technologies have led to significant advances in the field of text processing and document digitization. Specifically, many entities utilize document digitization processes to convert physical documents into digital documents for storing and easily accessing data in the physical documents. Many industries, such as medical service providers, legal service providers, digital libraries, or digital document repositories, receive and process large numbers of physical documents—sometimes including hundreds of thousands of pages per day. Converting large numbers of physical documents to digital documents can take a significant amount of time and computing resources. Additionally, because many entities rely on information in digitized documents, accurately converting physical documents to digital documents for later access via computing devices is an important, though difficult, task. Conventional systems typically utilize optical character recognition processes, which often inaccurately digitize text content in physical documents, especially for small, rotated, or distorted text. Specifically, conventional systems are unable to extract and redact entities within a document if the text is digitized incorrectly, which results in extracting redundant entities and poses significant challenges in identifying duplicate entities in the document.

SUMMARY

This disclosure describes one or more embodiments of methods, non-transitory computer readable media, and systems that solve the foregoing problems (in addition to providing other benefits) by correcting entity detection errors and by performing entity resolution in unstructured text documents. Specifically, the disclosed systems utilize a named entity recognition model to extract entities from character strings (e.g., words) in a digital text document. The disclosed systems also tokenize the character strings in the digital text document based on specific characters in the character strings and positions of the character strings within the digital text document. Furthermore, the disclosed systems compare the extracted entities and tokenized character strings to determine similarity metrics between the extracted entities and tokenized character strings based on corresponding string distances. In one or more embodiments, the disclosed systems also compare the extracted entities to character strings including non-standard characters (e.g., special characters, letters with non-standard cases) to determine similarity metrics indicating correlation probabilities between entities and character strings. The disclosed systems generate mappings between the tokens and entities based on the similarity metrics to resolve entities to likely corresponding character strings while correcting for errors during entity extraction. The disclosed systems thus utilize string tokenization and string distance metrics with probabilistic entity resolution to accurately digitize physical documents and efficiently process digital data.

BRIEF DESCRIPTION OF THE DRAWINGS

Various embodiments will be described and explained with additional specificity and detail through the use of the accompanying drawings in which:

FIG. 6 illustrates an example of the entity mapping system generating tokens for character strings in digital text in accordance with one or more implementations.

DETAILED DESCRIPTION

Figure 1:
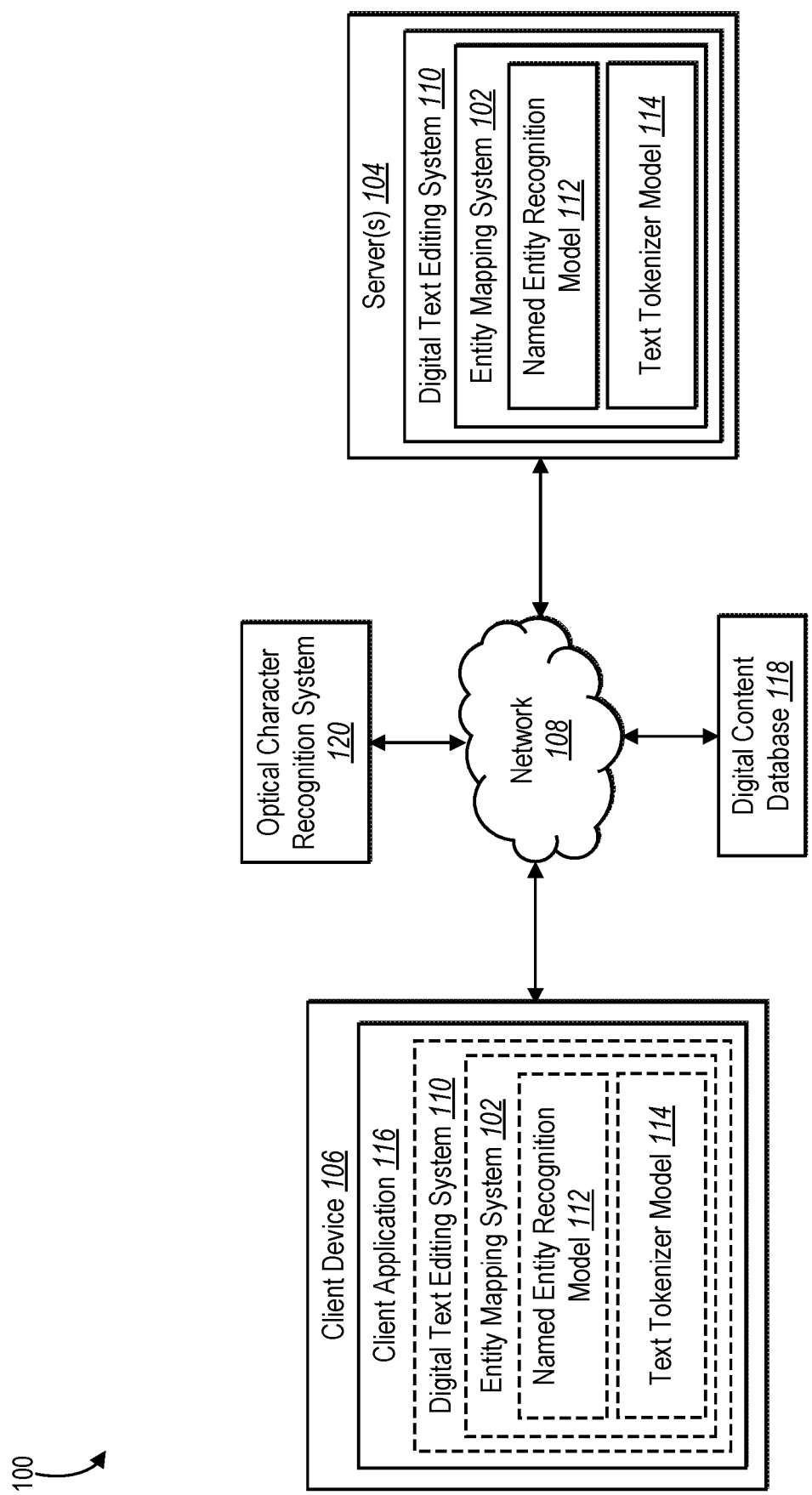
FIG. 1 illustrates an example of a system environment in which an entity mapping system can operate in accordance with one or more implementations.

This disclosure describes one or more embodiments of an entity mapping system that corrects entity extraction errors in connection with processing or digitizing text documents. In one or more embodiments, the entity mapping system utilizes entity extraction and position-based character string tokenization to resolve entities in unstructured data including incorrectly processed character strings. For example, the entity mapping system utilizes a named entity recognition model to extract entities from a digital text item in connection with one or more topics. The entity mapping system also utilizes a text tokenizer model to tokenize character strings (e.g., words) in the digital text item based on position information associated with the character strings. Additionally, the entity mapping system generates entity mappings between a list of extracted entities and a list of tokenized character strings based on correlation probabilities between the extracted entities and the tokenized character strings. In one or more embodiments, the entity mapping system utilizes the entity mappings to perform additional operations on the digital text item, such as by redacting entities and corresponding character strings of the digital text item. In some embodiments, the entity mapping system also identifies similar entities that correlate with high probability despite errors in digitization.

As mentioned, in one or more embodiments, the entity mapping system generates tokens for character strings in a digital text document. Specifically, the entity mapping system utilizes a text tokenizer model to generate a token for a character string in the digital text document based on one or more characters within the character string and a position of the character string within the digital text document. To illustrate, the entity mapping system generates a token from a character string based on the final character of the character string and the position of the first character of the character string within the digital text document. In some embodiments, the entity mapping system also sorts the tokens (e.g., alphabetically) within a list of tokens.

According to one or more embodiments, the entity mapping system determines entities from a digital text document. In particular, the entity mapping system utilizes a named entity recognition model to extract a plurality of entities from character strings in the digital text document. For instance, the entity mapping system utilizes a named entity recognition model trained on one or more topics or categories to extract a set of entities mentioned in the digital text document.

Additionally, in one or more embodiments, the entity mapping system compares entities extracted from a digital text document with tokens from the digital text document. For example, the entity mapping system determines string distances (e.g., Levenshtein distances) between an entity and one or more tokenized character strings. To illustrate, the entity mapping system sorts the tokenized character strings (e.g., alphabetically) in a list and determines string distances between entities and adjacent character strings in the list. Furthermore, in one or more embodiments, the entity mapping system determines similarity metrics (e.g., correlation probabilities) based on the distances between the entities and tokenized character strings. In additional embodiments, the entity mapping system also determines similarity metrics for multi-word entities and character strings (e.g., multi-word character strings) in the digital text document. According to some embodiments, the entity mapping system also compares entities extracted from the digital text document to a repository of entity mappings or entity correlations.

In at least some embodiments, the entity mapping system generates mappings between entities and character strings in a digital text document. Specifically, the entity mapping system utilizes the similarity metrics to determine character strings that are similar to extracted entities, but which may have been incorrectly digitized and include non-standard characters (e.g., special characters, incorrect letter cases). The entity mapping system generates the mappings between the entities and similar tokenized character strings by mapping the tokenized character strings to the entities, such as within an entity mapping database.

According to one or more embodiments, the entity mapping system 102 utilizes mappings between entities and tokenized character strings to modify a digital text document. For instance, the entity mapping system utilizes a mapping between an entity and a character string to modify the entity and the character string within the digital text document. To illustrate, the entity mapping system redacts instances of an entity and incorrectly digitized instances of the entity (e.g., character strings with incorrectly processed characters) based on a mapping between the entity and the character string.

As mentioned, conventional systems have a number of shortcomings in relation to processing and digitizing text documents. For example, many conventional systems utilize optical character recognition to digitize physical documents including text. While these conventional systems provide processes for digitizing physical documents through automatic conversion of physical text to digital text, optical character recognition ("OCR") often produces inaccurate digitization/deciphering of physical documents, especially for warped, small, rotated, or hard-to-see text. To illustrate, conventional systems can reproduce certain letters (e.g., "o") as numbers (e.g., "0"). Accordingly, the resulting digitized data can include inaccurate representations of the corresponding physical data.

Inaccuracies in OCR data can lead to further inaccuracies when performing additional operations on the digital text documents, such as automatic text redaction or data retrieval, identifying potentially duplicate entities, and text analysis. For example, some conventional systems utilize natural language processing models, such as named entity recognition model, to process unstructured data for automatic recognition of entities within digital text. When the underlying data includes errors (e.g., OCR errors), conventional systems that rely on such natural language processing models to identify entities in the data provide inaccurate results. Specifically, such conventional systems often miss extracting entities in digital text that includes incorrectly digitized entity instances.

The disclosed entity mapping system provides a number of advantages over conventional systems. For example, the entity mapping system provides improved accuracy for computing systems that process digital text including digitizing physical documents. In particular, in contrast to conventional systems that rely solely on named entity recognition models to extract entities from digital text for various text processing operations, the entity mapping system maps extracted entities to character strings in digital text based on string distance and similarity metrics. To illustrate, by utilizing string distances to determine character strings that have a high likelihood of correlating to entities, the entity mapping system can accurately map the entities to character strings even when the character strings include digitization errors or typos (e.g., determining that a character string is intended to be an entity despite errors in the text). Accordingly, by correcting errors introduced by computing processes (e.g., optical character recognition or named entity recognition models), the entity mapping system improves the accuracy of the computing devices in digitizing physical documents and accessing/modifying text data in digital documents. The entity mapping system also improves accuracy by leveraging a repository of existing entity mappings or correlations and user feedback in connection with different combinations of entities.

Additionally, the disclosed entity mapping system provides improved efficiency for computing systems that process digital text. Specifically, in contrast to conventional systems that incorrectly identify entities in digital text (e.g., due to missing entities that include errors), the entity mapping system utilizes accurate entity correction and resolution to provide more efficient digital text modification/data accessibility. For instance, the entity mapping system utilizes entity correction and resolution to more efficiently redact or access entities and corresponding character strings in digital text without requiring additional repeated searches and/or text modification operations. To illustrate, the entity mapping system is able to retrieve and/or modify an entity and similar character strings in a single operation via tokenization and mapping of the character strings to the entity. Furthermore, in contrast to conventional systems that process digital text by parsing the digital text each time a search is performed, the entity mapping system provides faster and more efficient accessing/modification of entities or character strings by determining and storing entity and character string position data obtained during the entity mapping process for later use (e.g., within the tokenization data for the text).

Turning now to the figures, FIG. 1 includes an embodiment of a system environment 100 in which an entity mapping system 102 is implemented. In particular, the system environment 100 includes server(s) 104 and a client device 106 in communication via a network 108. Moreover, as shown, the server(s) 104 include a digital text editing system 110, which includes the entity mapping system 102. As further illustrate in FIG. 1, the entity mapping system 102 includes a named entity recognition model 112 and a text tokenizer model 114. Furthermore, the client device 106 includes a client application 116. Additionally, the client application 116 optionally includes the digital text editing system 110 and the entity mapping system 102, which further includes the named entity recognition model 112 and the text tokenizer model 114. In some embodiments, as illustrated in FIG. 1, the system environment 100 includes a digital content database 118 and an optical character recognition system 120.

As shown in FIG. 1, in one or more implementations, the server(s) 104 includes or hosts the digital text editing system 110. Specifically, the digital text editing system 110 includes, or is part of, one or more systems that implement electronic survey management. For example, the digital text editing system 110 provides tools for generating, viewing, or otherwise interacting with digital content items including text. To illustrate, the digital text editing system 110 communicates with the client device 106 via the network 108 to provide the tools for display and interaction via the client application 116 at the client device 106. Additionally, in some embodiments, the digital text editing system 110 receives data from the client device 106 in connection with managing digital text, including requests to perform operations to process and/or modify digital documents stored at the server(s) 104, the client device 106, or at another device such as the digital content database 118 and/or requests to store digital documents from the client device 106 at the server(s) 104 (or at another device). In some embodiments, the digital text editing system 110 receives interaction data from the client device 106 for generating or viewing digital content, processes the interaction data (e.g., to retrieve and/or modify digital text), and provides the results of the interaction data to the client device 106 for display via the client application 116 or to a third-party system.

In one or more embodiments, the digital text editing system 110 provides tools for managing and modifying digital documents including text. In particular, the digital text editing system 110 provides tools (e.g., via the client application 116) for viewing digital text documents, retrieving data within digital text documents, or modifying digital text documents (e.g., redacting text). In one or more embodiments, the digital text editing system 110 obtains digital text documents from the digital content database 118 in connection with the optical character. For instance, the optical character recognition system 120 generates the digital text documents for storing in the digital content database 118 from physical text documents.

Additionally, the digital text editing system 110 utilizes the entity mapping system 102 to extract and map/resolve text entities in digital text documents. Specifically, the entity mapping system 102 utilizes the named entity recognition model 112 to extract entities from a digital text document. The entity mapping system 102 utilizes a text tokenizer model 114 to tokenize character strings in the digital text document. The entity mapping system 102 also maps the extracted entities (e.g., within an entity mapping database) to character strings by comparing the entities to the tokenized character strings. In additional embodiments, the entity mapping system 102 performs operations based on entity mappings, such as, but not limited to, retrieving text from digital text documents or redacting text in digital text documents.

In one or more embodiments, in response to the entity mapping system 102 utilizing entity mappings from one or more digital text documents to modify the digital text documents, the digital text editing system 110 provides the modified digital text documents to the client device 106. For instance, the digital text editing system 110 sends the modified digital text documents to the client device 106 for display within the client application 116. Additionally, the digital text editing system 110 can retrieve data associated with one or more corresponding entities from digital text documents to the client device 106.

In some embodiments, the client device 106 also provides feedback (e.g., based on user interactions via the client application 116) associated with one or more corresponding entities to the server(s) 104. The entity mapping system 102 can utilize the feedback to update one or more models and/or systems. For example, the entity mapping system 102 utilizes the feedback to improve learned entity mappings in an entity mapping database, which the entity mapping system 102 utilizes to improve the accuracy and efficiency of entity mapping operations for digital text documents. In some embodiments, the entity mapping system 102 also utilizes entity mappings to learn parameters (e.g., classifiers) of an natural language processing model, such as the named entity recognition model 112 for improved initial entity extraction.

In one or more embodiments, the server(s) 104 include a variety of computing devices, including those described below with reference to FIG. 15. For example, the server(s) 104 includes one or more servers for storing and processing data associated with digital text documents. In some embodiments, the server(s) 104 also include a plurality of computing devices in communication with each other, such as in a distributed storage environment. In some embodiments, the server(s) 104 include a content server. The server(s) 104 also optionally includes an application server, a communication server, a web-hosting server, a social networking server, a digital content campaign server, or a digital communication management server.

In addition, as shown in FIG. 1, the system environment 100 includes the client device 106. In one or more embodiments, the client device 106 includes, but is not limited to, a mobile device (e.g., smartphone or tablet), a laptop, a desktop, including those explained below with reference to FIG. 15. Furthermore, although not shown in FIG. 1, the client device 106 can be operated by a user (e.g., a user included in, or associated with, the system environment 100) to perform a variety of functions. In particular, the client device 106 performs functions such as, but not limited to, accessing, viewing, and interacting with digital content (e.g., digital text documents). In some embodiments, the client device 106 also performs functions for generating, capturing, or accessing data to provide to the digital text editing system 110 and the entity mapping system 102 in connection with digital text documents. For example, the client device 106 communicates with the server(s) 104 via the network 108 to provide information (e.g., user interactions) associated with editing digital text documents. Although FIG. 1 illustrates the system environment 100 with a single client device 106, in some embodiments, the system environment 100 includes a different number of client devices. In some embodiments, the client device 106 or the server(s) 104 also host the digital content database 118 and/or the optical character recognition system 120.

Additionally, as shown in FIG. 1, the system environment 100 includes the network 108. The network 108 enables communication between components of the system environment 100. In one or more embodiments, the network 108 may include the Internet or World Wide Web. Additionally, the network 108 can include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server(s) 104, the client device 106, and the respondent devices 108a-108n communicate via the network using one or more communication platforms and technologies suitable for transporting data and/or communication signals, including any known communication technologies, devices, media, and protocols supportive of data communications, examples of which are described with reference to FIG. 15.

Although FIG. 1 illustrates the server(s) 104, the client device 106, the digital content database 118, and the optical character recognition system 120 communicating via the network 108, in alternative embodiments, the various components of the system environment 100 communicate and/or interact via other methods (e.g., the server(s) 104, the client device 106, the digital content database 118, and/or the optical character recognition system 120 can communicate directly). Furthermore, although FIG. 1 illustrates the entity mapping system 102 being implemented by a particular component and/or device within the system environment 100, the entity mapping system 102 and/or the digital text editing system 110 can be implemented, in whole or in part, by other computing devices and/or components in the system environment 100 (e.g., the client device 106).

In particular, in some implementations, the entity mapping system 102 (or the digital text editing system 110) on the server(s) 104 supports the entity mapping system 102 (or the digital text editing system 110) on the client device 106. For instance, the entity mapping system 102 on the server(s) 104 generates or trains the entity mapping system 102 (e.g., the named entity recognition model 112 and/or the text tokenizer model 114) for the client device 106. The server(s) 104 provides the generated/trained entity mapping system 102 to the client device 106. In other words, the client device 106 obtains (e.g., downloads) the entity mapping system 102 from the server(s) 104. At this point, the client device 106 is able to utilize the entity mapping system 102 to generate entity mappings and edit digital text based on the entity mappings independently from the server(s) 104.

In alternative embodiments, the entity mapping system 102 includes a web hosting application that allows the client device 106 to interact with content and services hosted on the server(s) 104. To illustrate, in one or more implementations, the client device 106 accesses a web page supported by the server(s) 104. The client device 106 provides input to the server(s) 104 to perform digital text editing or data retrieval operations, and, in response, the entity mapping system 102 or the digital text editing system 110 on the server(s) 104 performs operations to edit digital text or retrieve data. The server(s) 104 provide the output or results of the operations to the client device 106.

Figure 2:
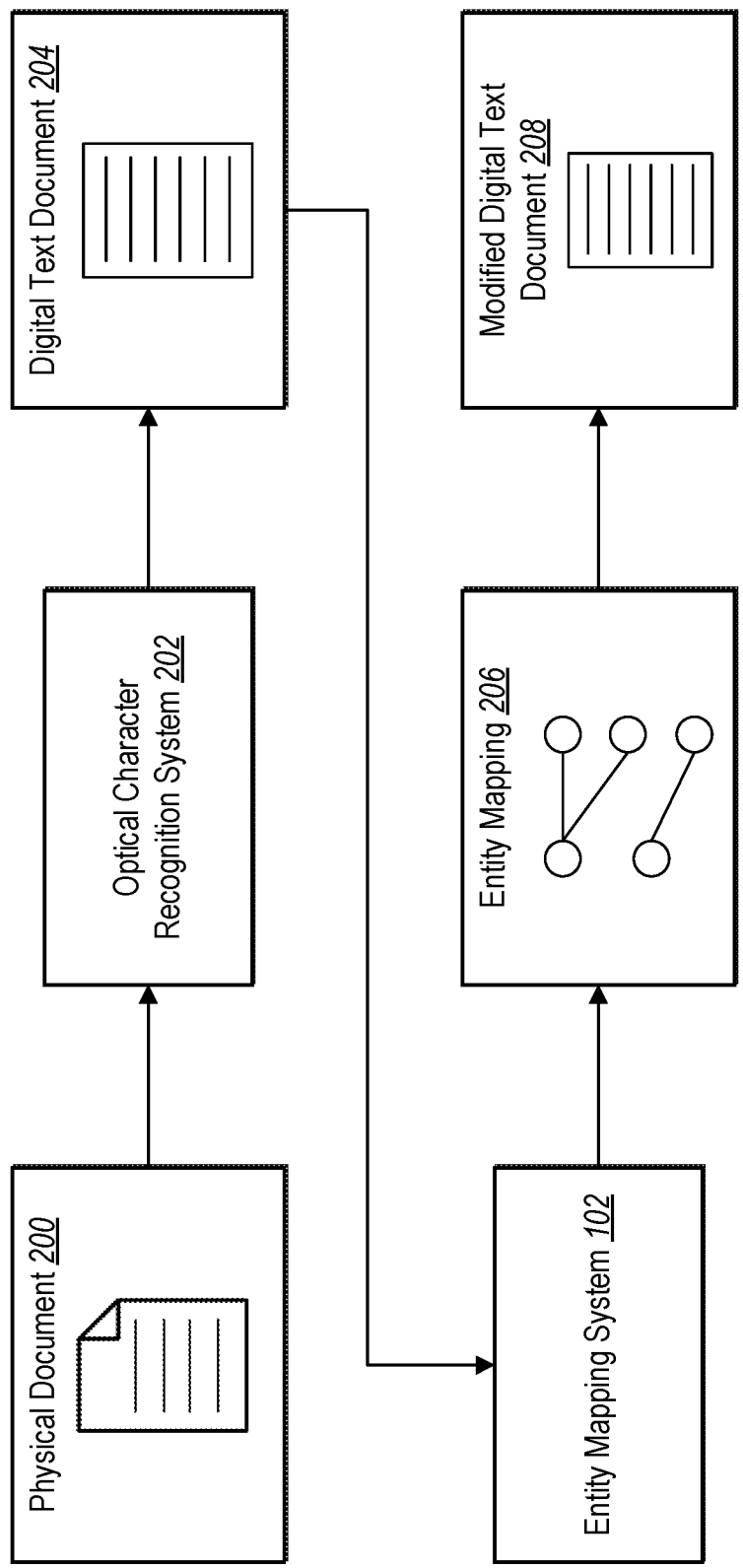
FIG. 2 illustrates an example of an overview of the entity mapping system utilizing mapping entities in connection with digitizing a physical document in accordance with one or more implementations.

As mentioned, the entity mapping system 102 utilizes entity mapping to digitize and modify physical documents. FIG. 2 illustrates an overview of a document digitization process in which the entity mapping system 102 generates entity mappings for modifying digital text extracted from a physical document 200. Specifically, FIG. 2 illustrates a process for digitizing a physical document 200, extracting and mapping entities from the digitized version of the document, and modifying the digitized version of the document based on the mappings.

In one or more embodiments, as illustrated in FIG. 2, an optical character recognition system 202 processes they physical document 200 to convert the physical document 200 into a digital text document 204. For instance, the optical character recognition system 202 utilizes image processing to convert physical text on the physical document 200 (e.g., text printed or written on the physical document 200) into digital text. To illustrate, the optical character recognition system 202 utilizes image processing to scan and detect printed or handwritten characters in physical documents (e.g., the physical document 200) according to one or more font sets. Additionally, the optical character recognition system 202 generates the digital text document 204 including digital text in an order or layout in which the text is displayed within the physical document 200.

In one or more embodiments, in connection with digitizing the physical document 200 to generate the digital text document 204, the entity mapping system 102 generates an entity mapping 206 based on a plurality of entities in the digital text document 204. For instance, as described in more detail with respect to FIG. 3 below, the entity mapping system 102 utilizes a named entity recognition model to extract entities corresponding to one or more topics or categories from the digital text document 204. Additionally, as described in more detail with respect to FIG. 3, the entity mapping system 102 utilizes a text tokenizer model to generate tokens for character strings in the digital text document 204. Furthermore, as described in more detail below with respect to FIGS. 3-11, the entity mapping system 102 compares entities to tokenized character strings to generate the entity mappings 206.

In addition to generating the entity mappings 206, according to one or more embodiments, the entity mapping system 102 (or another system such as the digital text editing system 110 of FIG. 1) generates a modified digital text document 208 based on the entity mapping 206. In particular, in response to a request to modify one or more entities (e.g., a request to redact instances of a name) within the digital text document 204, the entity mapping system 102 utilizes the entity mapping 206 to determine character strings corresponding to a particular entity in the digital text document 204. To illustrate, the entity mapping system 102 utilizes data from the tokens of character strings mapped to an entity to find and modify (e.g., redact) instances of the entity in the digital text document 204, which results in the modified digital text document 208. The entity mapping system 102 can also identify potential duplicate entities (e.g., John Smith, John A Smith) within the digital text document 204.

Figure 3:
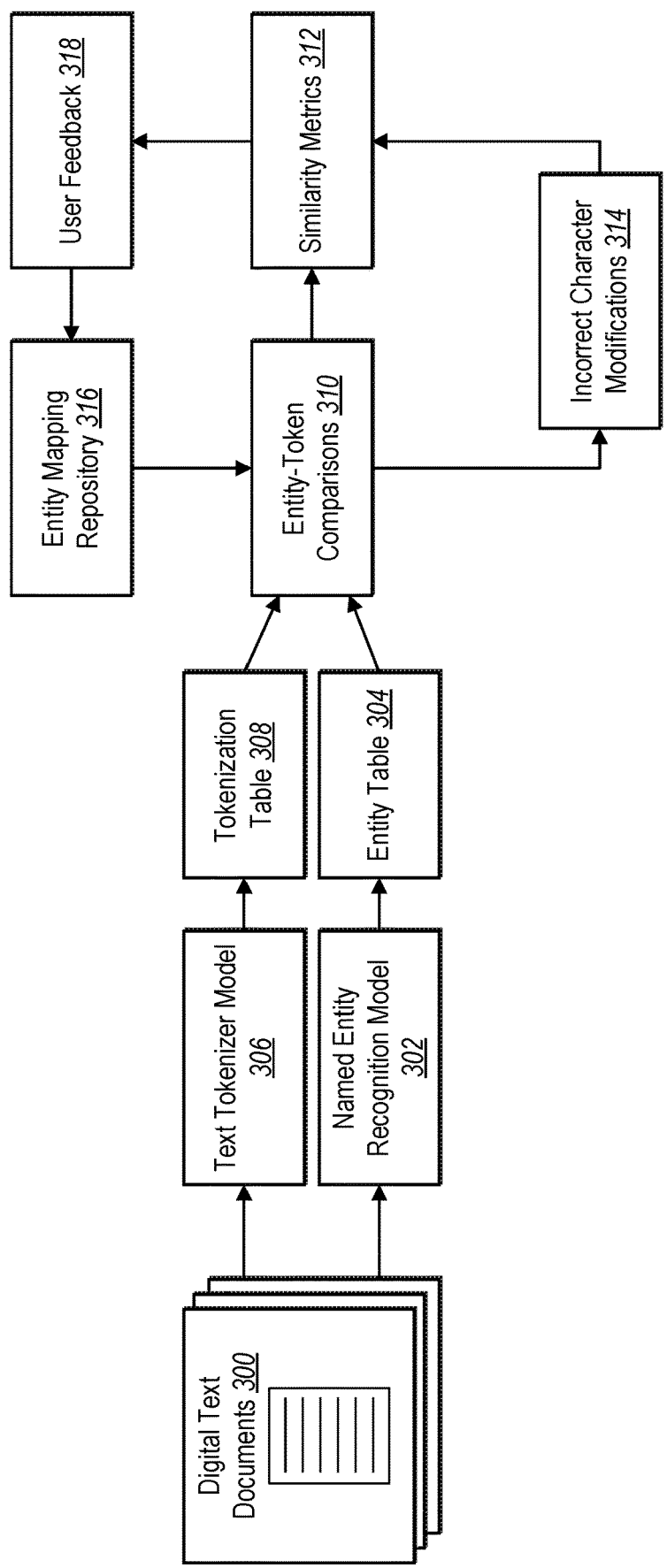
FIG. 3 illustrates an example of the entity mapping system utilizing entity-token comparisons to map entities from digital text in accordance with one or more implementations.

As mentioned, FIG. 3 illustrates an example of a process in which the entity mapping system 102 maps entities from digital text content based on similarity metrics between extracted entities and tokenized character strings in the digital text content. In particular, FIG. 3 illustrates that the entity mapping system 102 receives a plurality of digital text documents 300. In some embodiments, the digital text documents 300 include digitized versions of physical documents, though the digital text documents 300 may include any digital content items including text.

In one or more embodiments, the entity mapping system 102 utilizes a named entity recognition model 302 to extract a plurality of entities from the digital text documents 300. As illustrated in FIG. 3, the named entity recognition model 302 generates an entity table 304 including entities extracted from the digital text documents 300. According to one or more embodiments, an entity includes a character string such as a word or phrase that includes an object, such as a real-world object, or concept that is denoted with a specific name. For example, an entity includes a name, a city/country/region, a phone number, a social security number, etc., that a named entity recognition model is trained to identify in unstructured text data. Entities can include multi-word entities or phrases that combine to describe a particular object or concept. To illustrate, a single entity can be represented as include "United States" or "John Smith."

In one or more embodiments, the entity mapping system 102 utilizes the named entity recognition model 302 to extract specific entities corresponding to one or more specific topics/categories without extracting entities unrelated to the topics/categories. For instance, the named entity recognition model 302 extracts entities related to certain medical categories while ignoring entities in non-medical categories. Accordingly, the named entity recognition model 302 includes a model trained to extract specific entities related to a specific category (or categories). In alternative embodiments, the named entity recognition model 302 includes a model trained to extract entities related to a broad range of categories (e.g., without targeting a specific category).

As illustrated in FIG. 3, in addition to generating the entity table 304, the entity mapping system 102 utilizes a text tokenizer model 306 to generate tokens from character strings in the digital text documents 300. Specifically, the entity mapping system 102 utilizes the text tokenizer model 306 to generate tokens representing character strings (e.g., words or sets of characters separated by spaces or punctuation) in the digital text documents 300. In some embodiments, the entity mapping system 102 generates tokens based on attributes of the character strings in the digital text documents 300 including, but not limited to, character values and/or positions within each character string and/or within the digital text documents 300. Furthermore, in some embodiments, the entity mapping system 102 generates a tokenization table 308 including the tokens sorted according to a sorting method, such as alphabetically.

In response to generating the entity table 304 and the tokenization table 308, in one or more embodiments, the entity mapping system 102 compares entities in the entity table 304 to tokens in the tokenization table 308. In particular, as illustrated in FIG. 3, the entity mapping system 102 determines entity-token comparisons 310 based on similarities between the entities and the tokens. For example, the entity mapping system 102 determines one or more string distances between a given entity from the entity table 304 and one or more character strings in the tokenization table 308.

By comparing the entities in the entity table 304 to the character strings in the tokenization table 308, the entity mapping system 102 is able to identify character strings that are exactly the same as or very similar to identified entities. In one or more embodiments, as illustrated in FIG. 3, the entity mapping system 102 determines similarity metrics 312 based on the entity-token comparisons 310. For instance, the entity mapping system 102 utilizes string distances between an entity and one or more character strings to determine similarity metrics for the entity and one or more character strings. To illustrate, the entity mapping system 102 determines correlation probabilities (e.g., a likelihood of a match) for the entity and one or more character strings based on the string distances.

In one or more embodiments, the entity mapping system 102 utilizes incorrect character modifications 314 to determine the similarity metrics 312. Specifically, as previously mentioned, optical character recognition can result in incorrect detection of characters for various reasons (e.g., distorted text, light text, small text). The digital text documents 300 can also include typographical errors based on misspellings or misinputs. The entity mapping system 102 utilizes the incorrect character modifications 314 to modify/remove non-standard characters from character strings and corresponding positions in entities being compared to the character strings.

In one or more embodiments, a non-standard character includes a character that the entity mapping system 102 determines does not belong in a particular position in a character string. To illustrate, a non-standard character includes, but is not limited to, a special character, punctuation in the beginning or middle of a word (e.g., not at the end of a character string or sentence), uppercase letters after a first character of a word, lowercase letters at the beginning of words expected to have uppercase letters (e.g., in person names or locations), or other unexpected characters in character strings. Accordingly, the entity mapping system 102 utilizes the incorrect character modifications 314 to determine string distances and similarity metrics for entities and tokens while accounting for possible errors in digitization or text input in the digital text documents 300.

According to one or more embodiments, the entity mapping system 102 also utilizes an entity mapping repository 316 in connection with the entity-token comparisons 310 and/or the similarity metrics 312. For example, the entity mapping repository 316 includes a plurality of predetermined (e.g., pre-learned) entity-token relationships to more efficiently determine the entity-token comparisons 310 and/or the similarity metrics 312. In particular, the entity mapping system 102 compares a particular entity-token pair to the entity mapping repository 316 to determine if there is an existing relationship for the entity-token pair. Additionally, the entity mapping system 102 stores entity mappings for entity-token pairs with high similarity metrics (e.g., a threshold similarity metric) for inclusion in the entity mapping repository 316.

In additional embodiments, as illustrated in FIG. 3, the entity mapping system 102 utilizes user feedback 318 to update the entity mapping repository 316. Specifically, the entity mapping system 102 determines entity-token pairs that have similarity metrics that do not meet the threshold similarity metric, but which may meet a second threshold similarity metric (e.g., between a first threshold similarity metric and a second threshold similarity metric). The entity mapping system 102 provides such entity-token pairs to a user device for verifying whether to generate entity mappings for the entity-token pairs. Based on the user feedback 318, the entity mapping system 102 determines whether to generate an entity mapping for a given entity-token pair for storing in the entity mapping repository 316. Alternatively, the entity mapping repository 316 corresponds to a third-party system, such that the entity mapping system 102 does not update the entity mapping repository 316 with entity mappings.

Figure 4:
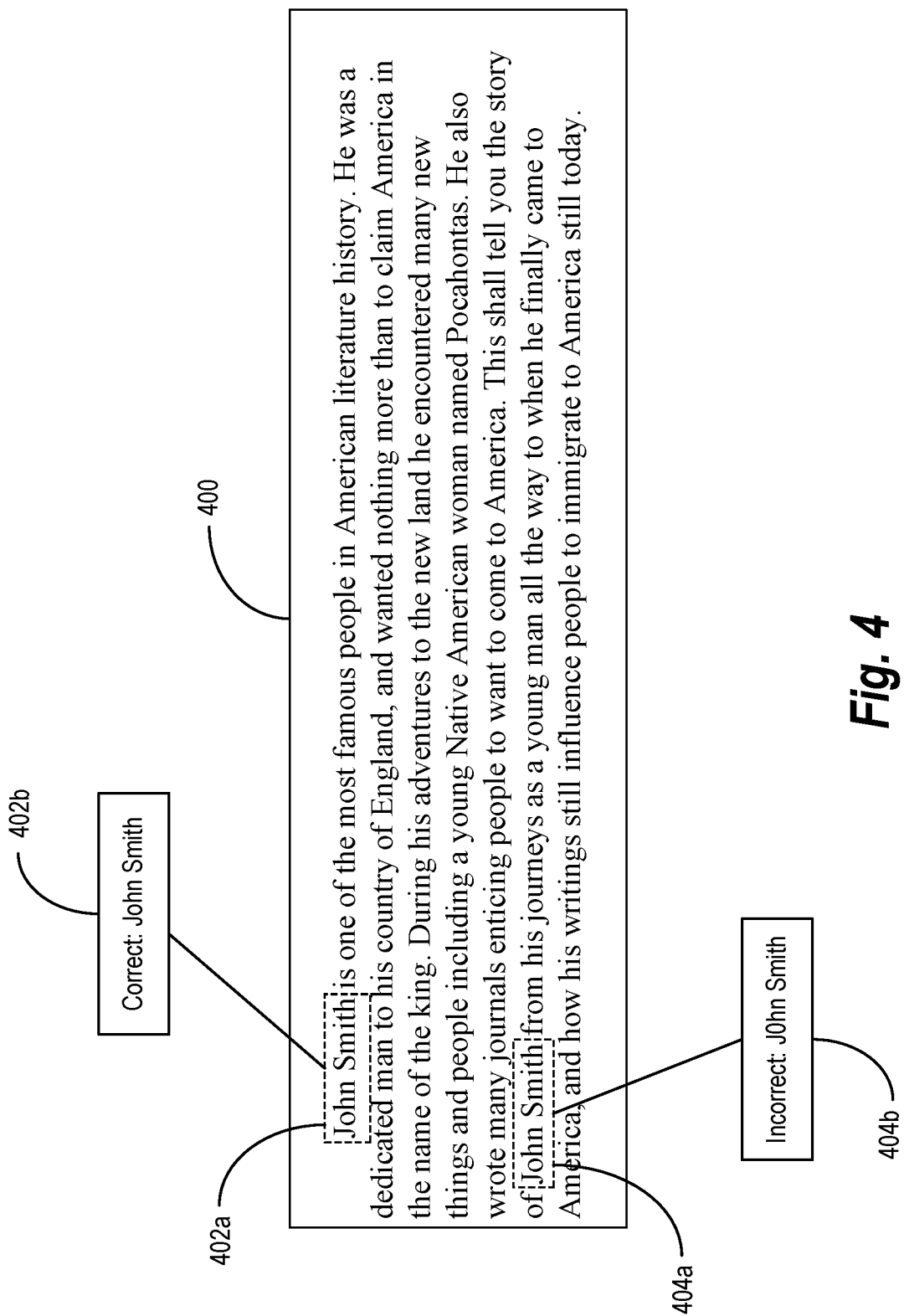
FIG. 4 illustrates an example of text including correctly captured entity and incorrectly captured entity in accordance with one or more implementations.

FIG. 4 illustrates an example of a portion of text including a number of different entities. Specifically, a text portion 400 includes a first character string 402a ("John Smith") that the entity mapping system 102 identifies from the text portion 400 based on optical character recognition analysis of the text portion 400. As illustrated, the entity mapping system 102 correctly extracts an entity 402b from the text portion 400 according to a trained named entity recognition model. Additionally, the text portion 400 includes a second character string 404a ("John Smith") that the optical character recognition analysis incorrectly translates ("JOhn Smith"), which results in a missed entity 404b. Accordingly, because the optical character recognition incorrectly processed the second character string 404a, a named entity recognition model may not recognize the second character string 404a as an additional instance of the entity 402b.

According to one or more embodiments, the entity mapping system 102 processes a plurality of digital text documents including any number of portions of text in a variety of formats. For instance, the entity mapping system 102 processes digital text documents including articles corresponding to one or more related categories, such that the text is arranged in pages and paragraphs. Additionally, in one or more embodiments, the entity mapping system 102 processes digital text documents including forms such as forms, surveys, or fillable field documents (e.g., medical records/histories). Thus, while FIG. 4 illustrates the entity mapping system 102 processing the text portion 400 including text in paragraph form, the entity mapping system 102 can also process text in other forms.

Figure 5:
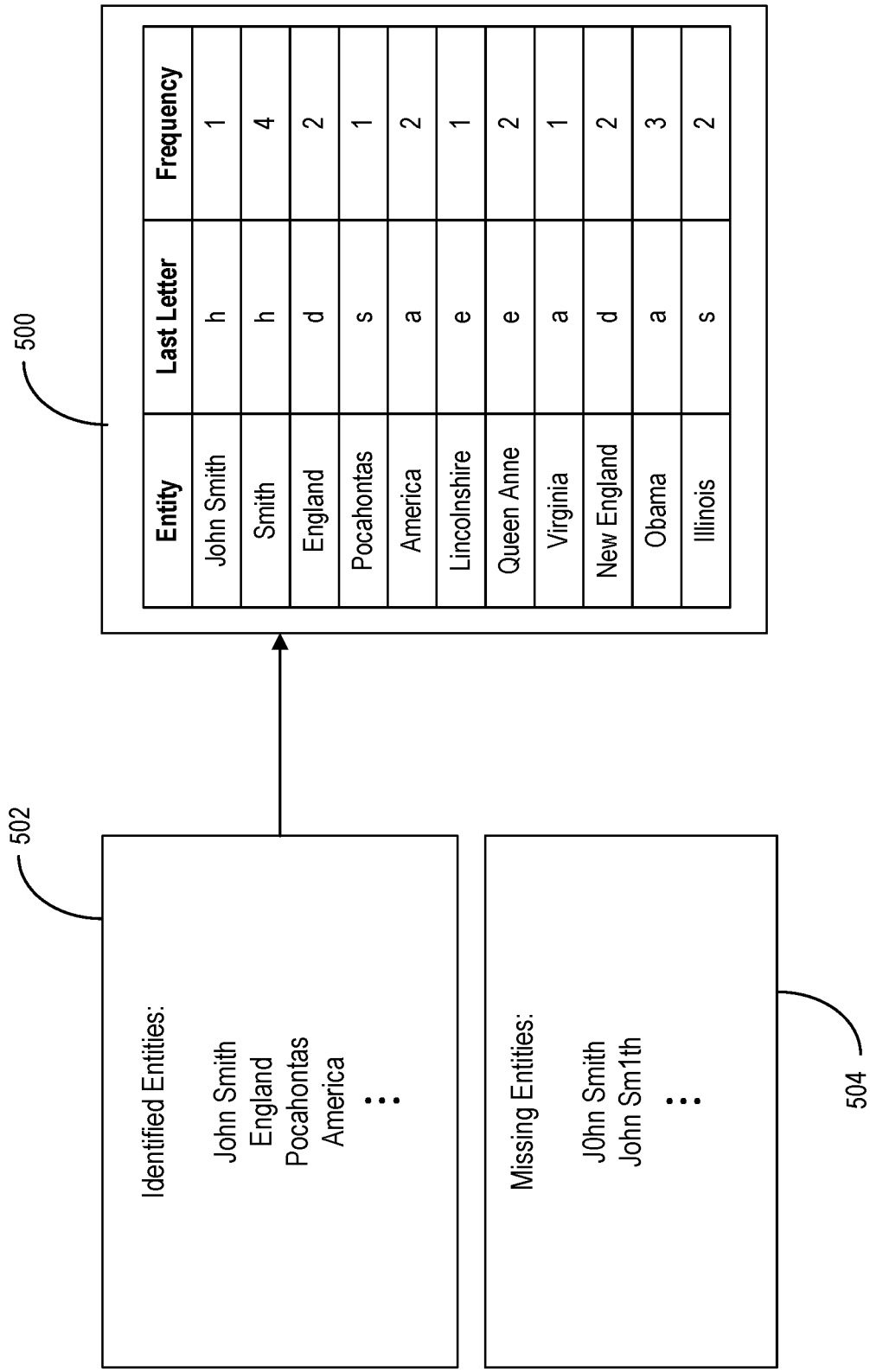
FIG. 5 illustrates an example of the entity mapping system determining extracted entities from digital text in accordance with one or more implementations.

FIG. 5 illustrates that the entity mapping system 102 extracts a plurality of entities from a plurality of digital text documents. Specifically, the entity mapping system 102 utilizes a named entity recognition model to extract a set of entities related to one or more categories from the digital text documents. Additionally, as illustrated in FIG. 5, in response to extracting a plurality of entities, the entity mapping system 102 also generates an entity table 500 including the entities and information associated with the entities.

In one or more embodiments, the entity mapping system 102 utilizes a named entity recognition model including a machine-learning model trained on entities for one or more categories to extract the entities from the digital text documents. For instance, the named entity recognition model includes a conditional random field or a hidden Markov model to extract entities from the digital text documents. Additionally, the named entity recognition model can utilize regular expression classifiers or other classifiers to process character strings in digital text and identify entities mentioned within the text. In alternative embodiments, the entity mapping system 102 utilizes a named entity recognition model including a knowledge-based model that utilizes a database or lexicon of entities for extracting from the digital text documents. As previously mentioned, the entity mapping system 102 can utilize a named entity recognition model trained to extract specific entities corresponding to categories such as location, person, organization, date, time, etc. In addition, the entity mapping system 102 can utilize a named entity recognition model for categories such as medical terms, geographical terms, or other terms corresponding to a particular type of entity.

According to one or more embodiments, the entity mapping system 102 utilizes the named entity recognition model to extract a set of entities 502 from the digital text documents. Specifically, as illustrated in FIG. 5, the set of entities 502 includes a plurality of entities mentioned within the text (e.g., as one or more character strings) and corresponding to one or more categories for which the named entity recognition model is trained. For example, as shown in FIG. 5, the entity mapping system 102 utilizes the named entity recognition model to identify single or multi-word entities, such as "John Smith," "England," "Pocahontas," "America," etc., as in the text illustrated in FIG. 4. Furthermore, the entity mapping system 102 determines the set of entities 502 from additional digital text documents, such as a database of digital text documents.

As illustrated in FIG. 5, in one or more embodiments, the entity mapping system 102 generates the entity table 500 from the set of entities 502. In particular, the entity mapping system 102 stores the entities in the entity table 500 according to the order in which the entities occur in the digital text documents as processed. In some embodiments, the entity mapping system 102 generates an entry in the entity table 500 for each entity that the entity mapping system 102 extracts.

In additional embodiments, as illustrated in FIG. 5, the entity mapping system 102 stores additional information associated with the entities in the entity table 500. For example, the entity mapping system 102 maintains a frequency counter for each occurrence of an entity in digital text documents. In particular, the entity mapping system 102 increments the frequency counter each time the entity mapping system 102 encounters an entity in the digital text documents. Furthermore, as illustrated in FIG. 5, in one or more embodiments, the entity mapping system 102 stores a last character/letter for each entity in the entity table 500. To illustrate, the entity mapping system 102 stores a character string for an entity in a first column, a last letter of the character string in a second column, and a frequency counter for the entity in a third column of the entity table 500.

In one or more embodiments, the named entity recognition model can miss (e.g., fails to recognize) one or more entities for various reasons. For instance, FIG. 5 illustrates a set of missed entities 504 from the digital text documents. More specifically, the set of missed entities 504 includes character strings that the named entity recognition model did not recognize as valid entities corresponding to the one or more entities. To illustrate, the named entity recognition model may miss entities due to the character strings including incorrectly processed characters (e.g., numbers or punctuation instead of letters or incorrect letter casing), such as "JOhn Smith" or "John Smith." Because the named entity recognition model fails to recognize one or more entities, the entity mapping system 102 also does not insert the missed entities into the entity table 500.

In addition to extracting entities from digital text documents, in one or more embodiments, the entity mapping system 102 also generates tokens for character strings in the digital text documents. In particular, the entity mapping system 102 tokenizes the character strings based on attributes associated with the character strings. For example, the entity mapping system 102 utilizes a text tokenization model to generate tokens including the character string (e.g., a word), one or more specific character values (e.g., a final character value corresponding to a last letter position) in the character string, and a position of the first character of the character string within a digital text document. Accordingly, the entity mapping system 102 utilizes the text tokenization model to sequentially process character strings in the digital text document and generate tokens for the character strings based on the corresponding attributes of the character strings.

FIG. 6 illustrates a plurality of sub-tables 600*a*-600*e* of a tokenization table including tokenized character strings from one or more digital text documents. In one or more embodiments, the entity mapping system 102 maps the tokens as a list within the tokenization table by sorting the tokenized character strings alphabetically. To illustrate, a first sub-table 600*a* includes a first set of tokenized character strings having a first character with a first character value (e.g., "A"). Additionally, a second sub-table 600*b* includes a second set of tokenized character strings having a first character with a second character value (e.g., "I"). Similarly, FIG. 6 illustrates a third sub-table 600*c*, a fourth sub-table 600*d*, and a fifth sub-table 600*e* corresponding to different starting character values of tokenized character strings, though the entity mapping system 102 determines additional sub-tables for additional starting character values not shown in FIG. 6.

In one or more embodiments, the entity mapping system 102 sorts the character strings into a plurality of sets of character strings according to starting letters, as well as sets of character strings according to non-standard starting characters. For instance, the entity mapping system 102 determines one or more character strings beginning with each of a plurality of special characters or character values. To illustrate, the fifth sub-table 600*e* includes character strings with a non-standard starting character value (e.g., "!").

Additionally, as mentioned, the entity mapping system 102 tokenizes a character string based on a plurality of attributes including the character string (e.g., word), the final character value, and the position of the first character within the digital text document. In one or more embodiments, the entity mapping system 102 generates a token for a character string by generating a vector or table entry including information about the attributes of the character string. For instance, the entity mapping system 102 generates a token for a character string by placing an attribute into a column, vector position, or entry position corresponding to the particular attribute. In some embodiments, the entity mapping system 102 determines each character string based on character values separated by spaces, commas, and/or periods (e.g., to detect individual words within one or more digital text documents).

To illustrate, FIG. 6 illustrates a first token entry 602 in the third sub-table 600*c* corresponding to a first character string ("John"). In one or more embodiments, the entity mapping system 102 generates a token for "John" by determining the word ("John"), a final character value ("n"), and a first/starting character position ("434") within the digital text document. Additionally, the entity mapping system 102 generates a second token entry 604 in the third sub-table 600*c* corresponding to a second character string ("JOhn"). The entity mapping system 102 generates a token for "JOhn" by determining the word ("JOhn"), a final character value ("n"), and a first/starting character position ("3674") within the digital text document.

Figure 7:
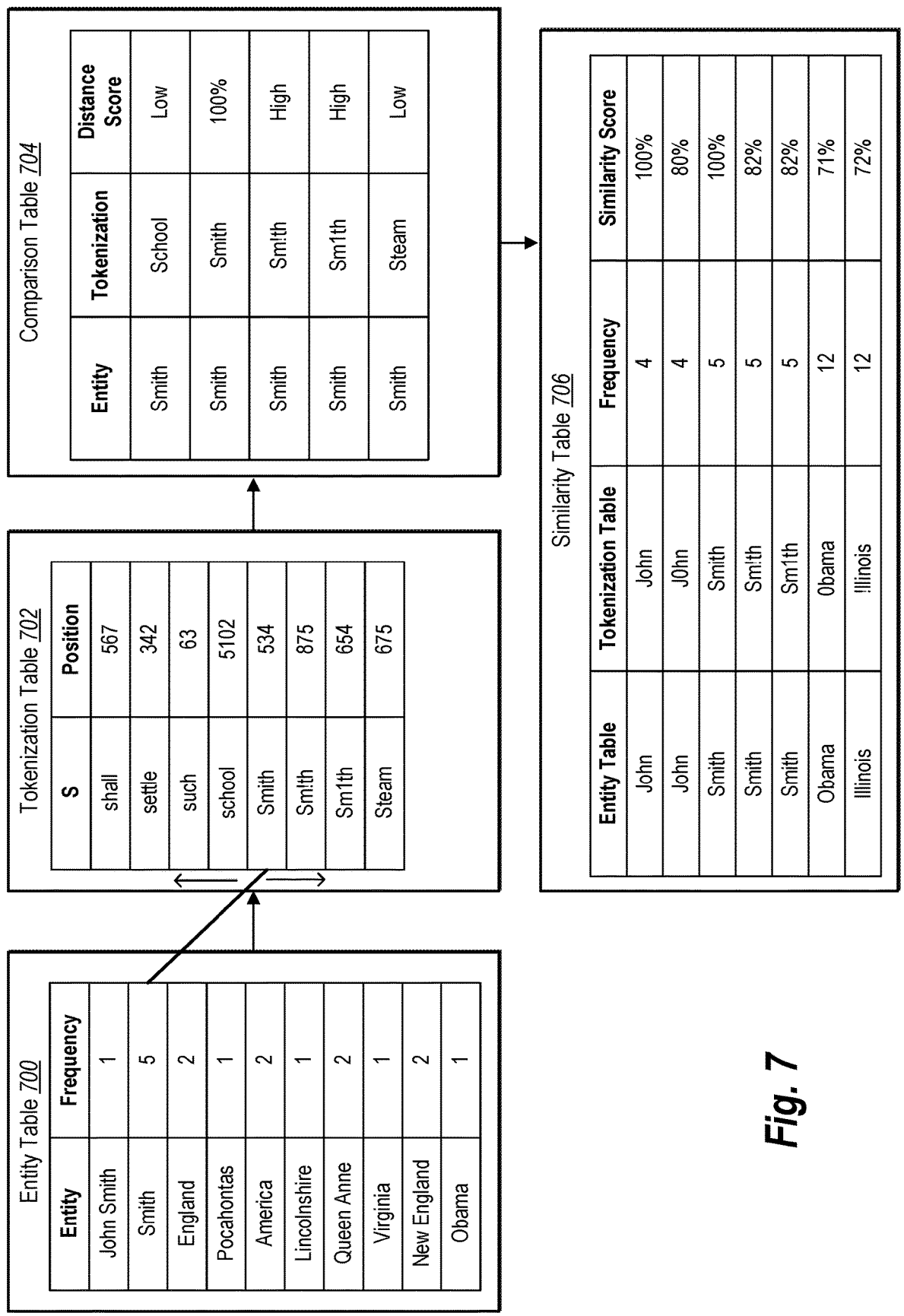
FIG. 7 illustrates an example of the entity mapping system tokenizing character strings in digital text for comparison to extracted entities in accordance with one or more implementations.

According to one or more embodiments, the entity mapping system 102 utilizes an entity table and a tokenization table for one or more digital text documents to compare extracted entities with tokenized character strings. FIG. 7 illustrates an example of the entity mapping system 102 comparing extracted entities to tokenized character strings to verify that all of the entities are accounted for and accurately map to character strings within one or more digital text documents. In particular, the entity mapping system 102 compares entities in an entity table 700 to tokens in a tokenization table 702 corresponding to one or more digital text documents to determine similarities between the entities and tokens.

In one or more embodiments, the entity mapping system 102 compares the entity table 700 to the tokenization table 702 by traversing tokenized character strings within the tokenization table 702 according to entities in the entity table 700. As previously mentioned, in one or more embodiments, the tokenization table includes tokens for character strings sorted alphabetically. The entity mapping system 102 compares the entity table 700 to the tokenization table 702 by determining positions of character strings corresponding to entities in the tokenization table 702 and comparing the entities to the corresponding character strings and adjacent or nearby character strings.

For example, as illustrated in FIG. 7, the entity mapping system 102 determines a position of the entity "Smith" obtained from the entity table 700 in the tokenization table 702. The entity mapping system 102 compares the entity and a plurality of corresponding character strings in the tokenization table 702 near the position of the corresponding character string in the tokenization table 702 (e.g., within a threshold number of entries in the tokenization table 702 in each direction before and after the corresponding character string). To illustrate, the entity mapping system 102 compares the entity "Smith" to the character string "Smith" (which the entity mapping system 102 processed to extract the entity) and to one or more additional character strings before and after "Smith" based on alphabetical sorting (e.g., "school," "Smith," "Smith," "steam," "such").

According to one or more embodiments, the entity mapping system 102 utilizes an entity-token scoring model to determine a similarity between an entity and each of a plurality of corresponding tokens. For instance, the entity mapping system 102 utilizes the entity-token scoring model to determine a string distance between an entity and a character string. To illustrate, the entity mapping system 102 determines a string distance between the entity "Smith" from the entity table 700 and the character string "Smith" from the tokenization table 702. In one or more embodiments, the entity mapping system 102 determines a distance score based on the Levenshtein distance between the entity and the token, which indicates the minimum number of single-character edits (insertions, deletions or substitutions) required to change one word into the other. As illustrated in FIG. 7, the entity mapping system 102 determines that the entity and the token are a perfect match.

As further illustrated in FIG. 7, the entity mapping system 102 utilizes the entity-token scoring model to determine the string distances between the entity and a plurality of additional character strings. In one or more embodiments, the entity mapping system 102 determines a distance score for each entity-token pair based on the string distance (e.g., Levenshtein distance) for each entity-token pair. To illustrate, the entity mapping system 102 determines that the distance score for the entity "Smith" and character string "Sm 1th" is high, while the distance score for the entity "Smith" and character string "school" is low. According to various embodiments, the distance score includes a score equal to the string distance or a score inversely proportional to the string distance.

In one or more embodiments, for character strings that include non-standard characters, the entity mapping system 102 modifies the character strings and/or entities in the entity-token pairs when determining the string distances. For instance, in response to determining that a character string from the tokenization table 702 includes a non-standard character (e.g., a number or a special character), the entity mapping system 102 removes the non-standard character from the character string. Additionally, the entity mapping system 102 removes a character at a corresponding position in the entity being compared to the character string. To illustrate, if a character string includes a number in the second position (e.g., in "JOhn"), the entity mapping system 102 removes the number from the character string and the character in the second position from the entity. The entity mapping system 102 determines the distance score based on the remaining characters.

In one or more embodiments, the entity mapping system 102 also modifies an entity-token pair in response to determining that a character string includes an uppercase letter embedded within the character string (e.g., in a position other than the first character in the character string). The entity mapping system 102 modifies the character string to change the uppercase letter to a lowercase letter. The entity mapping system 102 compares the entity to the modified character string by determining a distance score based on the character string including the lowercase letter. Accordingly, the entity mapping system 102 accounts for special characters, numbers, and different letter cases when determining distance scores.

In some embodiments, the distance score for an entity-token pair involving a non-standard character assigns a distance score based on a visual similarity between the non-standard character and the corresponding character in the entity. For instance, "0" is visually similar to "o". Accordingly, the entity mapping system 102 determines a higher distance score for an entity-token pair including such a non-standard character than for an entity-token pair including a "&" in a position corresponding to "e" (or another character) in the entity. Thus, in some embodiments, the entity mapping system 102 utilizes a combination of Levenshtein distance and visual similarity to determine the distance score.

In one or more embodiments, in addition to determining a distance score for an entity-token pair, the entity mapping system 102 determines a similarity (e.g., a similarity score) for the entity-token pair, as shown in the similarity table 706 of FIG. 7. For example, the entity mapping system 102 utilizes the entity-token scoring model to determine a correlation probability between the entity and the corresponding character string. Specifically, the entity mapping system 102 determines the correlation probability based on the distance score. In some embodiments, the entity mapping system 102 determines the correlation probability based on a number of distance score relative to a total number of characters in the entity (e.g., 2 character differences in a 10-character entity has a higher correlation probability than 2 character differences in a 4-character entity). Alternatively, the entity mapping system 102 determines the correlation probability as the distance score (e.g., the distance score is the correlation probability).

To illustrate, in response to determining that a distance score for an entity-token pair is high, the entity mapping system 102 also determines a correlation probability indicating a likelihood that the entity and the character string for a particular token are intended to be the same word. Thus, the entity mapping system 102 determines that the entity "Smith" and the character string "Smith" have a 100% correlation probability, while the entity "Smith" and character string "Smith" have a high correlation probability (e.g., 82%) based on a single character difference. Additionally, the entity mapping system 102 determines that the entity "Smith" and the character string "school" have a low correlation probability.

Figure 8:
FIG. 8 illustrates an example of the entity mapping system determining similarity metrics for entities and tokens in digital text based on an entity mapping repository in accordance with one or more implementations.

According to one or more embodiments, the entity mapping system 102 utilizes an entity mapping repository to determine similarity scores for entity-token pairs in an entity table and a tokenization table. Specifically, FIG. 8 illustrates that the entity mapping repository includes a similarity table 800 of previously identified entity mappings or similarity scores for entity-token pairs. For instance, prior to determining a distance score for an entity-token pair in a digital text document, the entity mapping system 102 compares the entity-token pair to previously stored entity-token pairs in the entity mapping repository to determine whether the entity mapping repository has a previously stored similarity score for the entity-token pair. In response to determining that the entity mapping repository has a corresponding entity-token pair, the entity mapping system 102 utilizes the stored similarity score for the entity-token pair.

In one or more embodiments, as mentioned, the entity mapping system 102 stores entity mappings in the entity mapping repository. For example, in response to determining that an entity-token pair has a similarity score that meets a threshold score (e.g., above 80% correlation probability), the entity mapping system 102 stores the entity-token pair and similarity score in the similarity table 800. Additionally, the entity mapping system 102 stores entity-token pairs in the entity mapping repository in response to user feedback indicating to generate a mapping for the entity-token pair.

In additional embodiments, the entity mapping system 102 utilizes entity-token pairs in a digital text document to modify existing entity-token pairs in the entity mapping repository. In particular, in response to determining that the entity mapping repository includes an entity-token pair based on a digital text document, the entity mapping system 102 changes a similarity score for the entity-token pair in the entity mapping repository. To illustrate, for an entity-token pair with a similarity score of 80% correlation probability (or a high correlation probability above a specific threshold probability), the entity mapping system 102 increases the similarity score to 95% correlation probability in response to detecting the entity-token pair in another digital text document.

Figure 9:
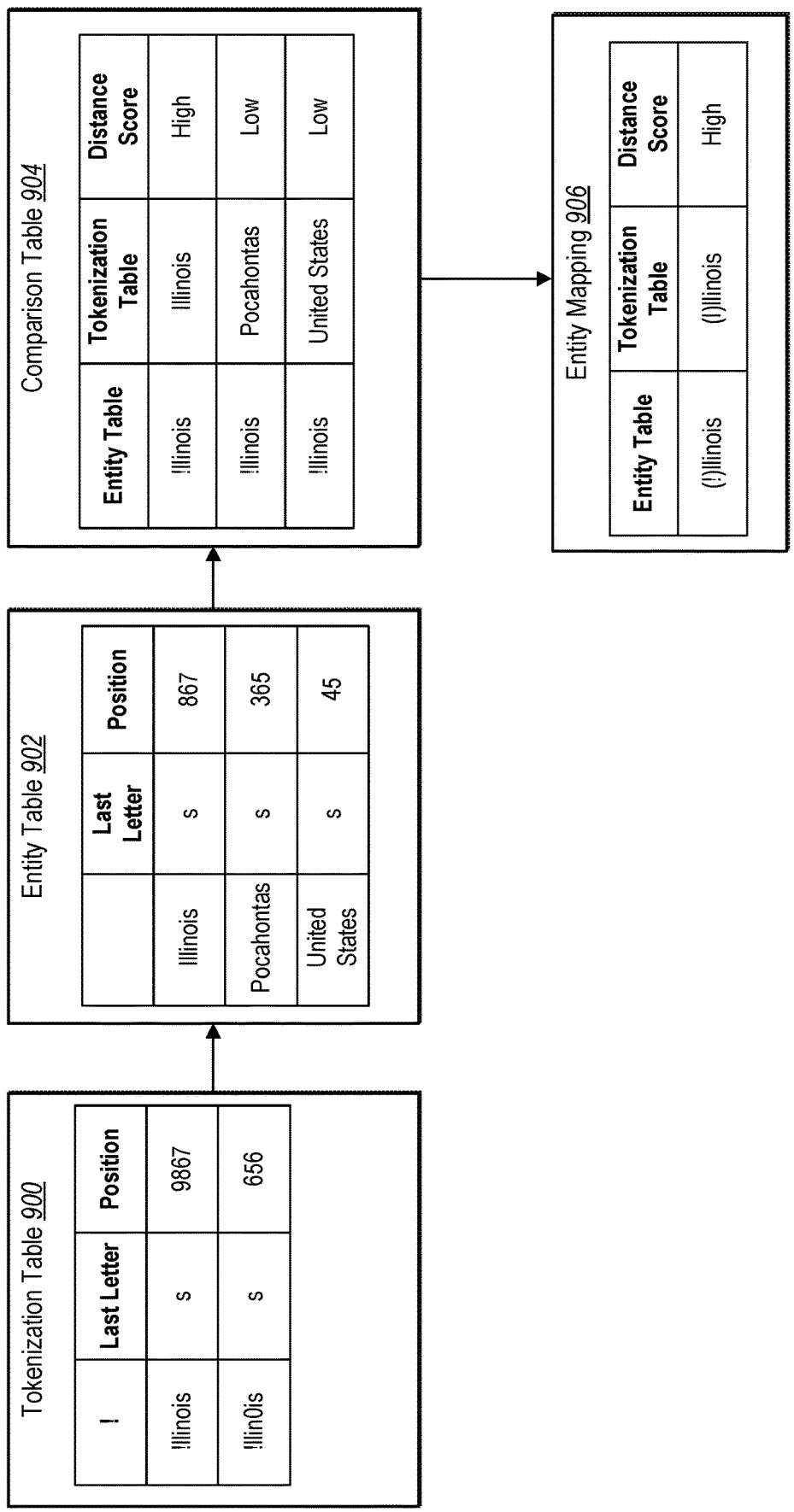
FIG. 9 illustrates an example of the entity mapping system determining distance scores for entities and tokenized character strings including non-standard characters in accordance with one or more implementations.

According to some embodiments, as illustrated in FIG. 9, the entity mapping system 102 determines entity-token pairs for character strings including numerical or special characters as first characters. Specifically, by sorting a tokenization table alphabetically by first character, character strings that would otherwise be in a specific position within the tokenization table are sorted into a different position. To illustrate, a character string "!llinois" corresponds to an incorrectly processed string "Illinois." Because the character string does not begin with "I," however, the entity mapping system 102 sorts the character string into a different portion of the tokenization table.

To find corresponding entities for such character strings, the entity mapping system 102 compares the character strings in a tokenization table 900 to entities ending with the same final character from an entity table 902, as shown in FIG. 9. For example, the entity mapping system 102 determines that "!llinois" from the tokenization table 900 includes "s" as the final character. The entity mapping system 102 also determines entities from the entity table 902 that include "s" as the final character.

In one or more embodiments, the entity mapping system 102 compares the entities starting with a numerical character or special character to corresponding entities from the entity table. In particular, the entity mapping system 102 compares "!llinois" to "Illinois" and "Pocahontas". The entity mapping system 102 utilizes the entity-token scoring model to determine a distance score for each entity-token pair. As illustrated in FIG. 9, the entity mapping system 102 determines that "!llinois" has a high distance score with "Illinois" and a low distance score with "Pocahontas."

Additionally, the entity mapping system 102 also determines an entity mapping 906 between "!llinois" and "Illinois". Specifically, in response to determining that the entity-token pair has a high distance score even with the special character, the entity mapping system 102 removes the first character from the character string (e.g., "(!)llinois") and the entity (e.g., "(I)llinois"). The entity mapping system 102 compares the character string without the first character to the entity without the first character. In response to determining that the entity-token pair is a match without the first characters, the entity mapping system 102 generates the entity mapping 906 for the entity-token pair.

Figure 10:
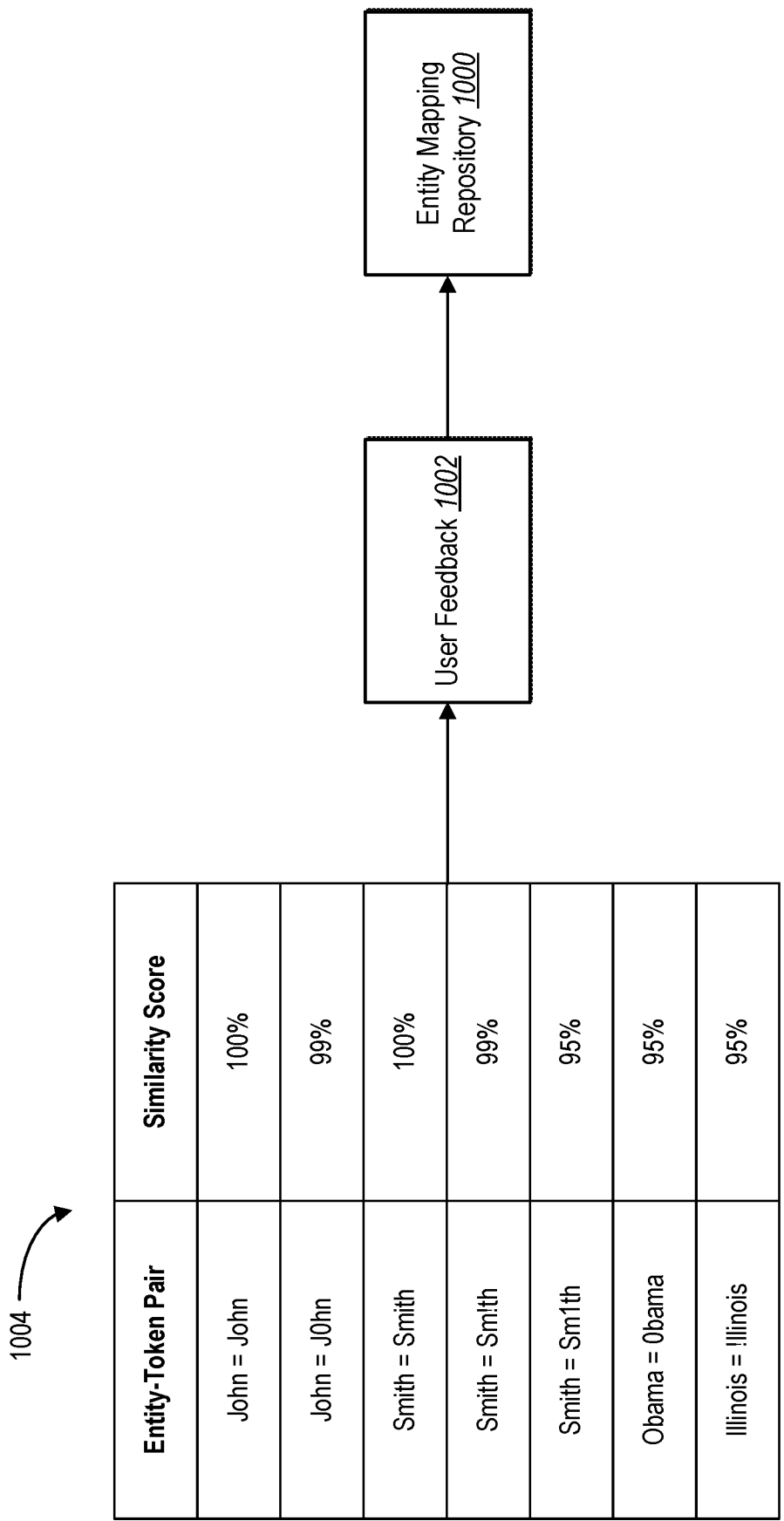
FIG. 10 illustrates an example of the entity mapping system utilizing user feedback to update entity mappings in an entity mapping repository in accordance with one or more implementations.

As previously mentioned, in one or more embodiments, the entity mapping system 102 stores entity mappings in an entity mapping repository. For example, FIG. 10 illustrates that the entity mapping system 102 stores entity mappings within an entity mapping repository 1000 based on user feedback 1002. Specifically, the entity mapping system 102 utilizes the user feedback 1002 to determine whether to store entity-token pairs and corresponding similarity scores (e.g., in a similarity table 1004) in the entity mapping repository 1000.

According to one or more embodiments, the entity mapping system 102 determines a plurality of entity-token pairs to present at a client device. For instance, the entity mapping system 102 compares similarity scores of the entity-token pairs in the similarity table 1004 to a first threshold score. In response to the similarity scores for a subset of entity-token pairs meeting the first threshold score (e.g., equal to or higher than 75% or 80%), the entity mapping system 102 also compares the similarity scores to a second threshold score to (e.g., 95%) to determine whether the similarity scores are between the first threshold score and the second threshold score. In response to determining that the entity-token pairs are between the first and second threshold scores, the entity mapping system 102 selects the entity-token pairs for display to a user at the client device. In alternative embodiments, the entity mapping system 102 utilizes a single threshold score for determining whether to provide the entity-token pairs to the user.

In one or more embodiments, the entity mapping system 102 detects a user interaction associated with an entity-token pair to indicate an entity mapping or to exclude an entity mapping for the entity-token pair. For example, in response to detecting an interaction to indicate an entity mapping for an entity-token pair, the entity mapping system 102 updates the entity mapping repository 1000 by storing the entity mapping for the entity-token pair in the entity mapping repository 1000. Alternatively, in response to detecting an interaction to indicate no entity mapping for the entity-token pair, the entity mapping system 102 updates the entity mapping repository 1000 to exclude an entity mapping for the entity-token pair. In additional embodiments, the entity mapping system 102 determines to exclude an entity mapping for an entity-token pair that a user skipped (e.g., no interaction). In some embodiments, rather than generating or excluding an entity mapping for an entity-token pair, the entity mapping system 102 updates a similarity score or correlation probability based on the user feedback 1002.

Figure 11:
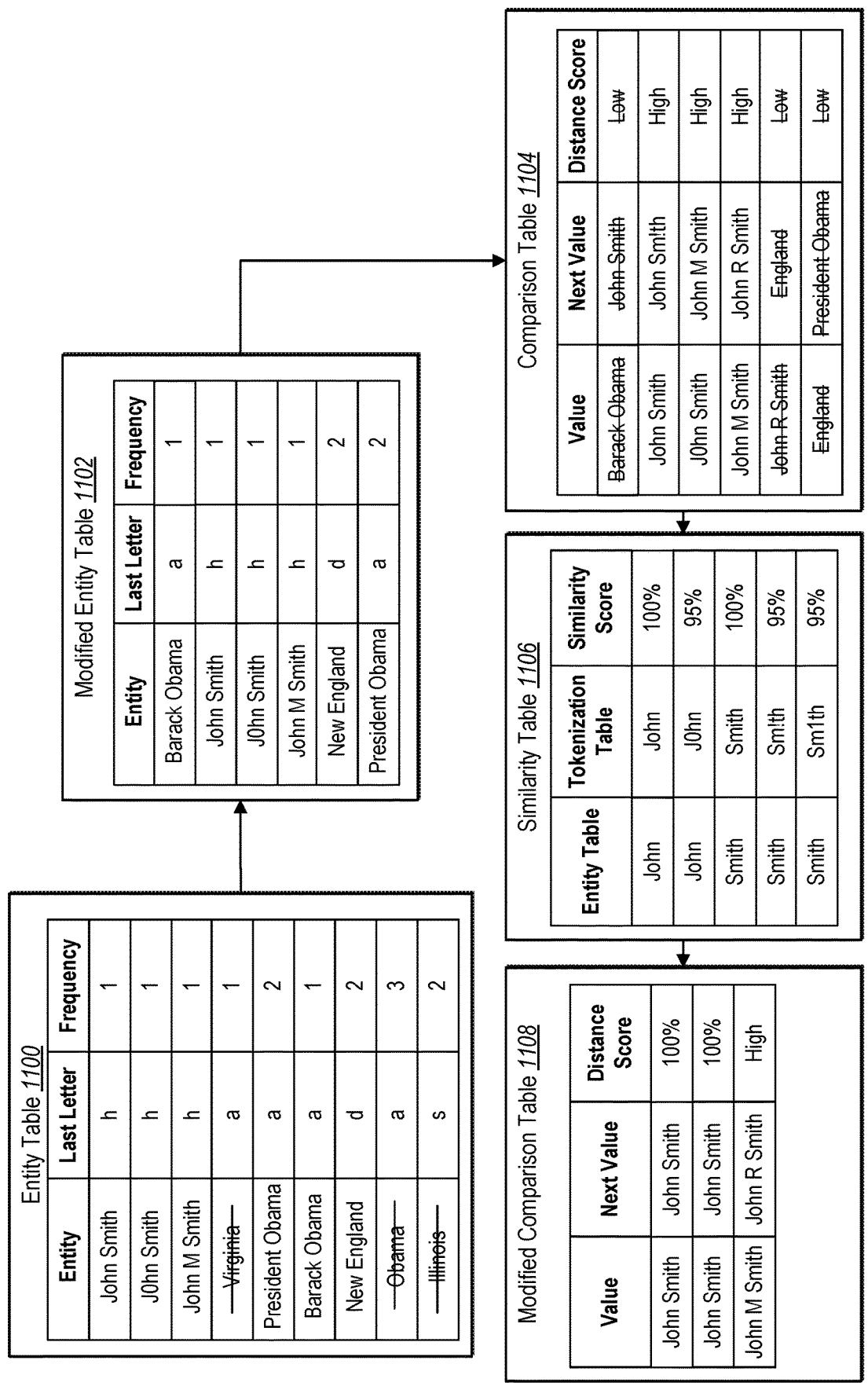
FIG. 11 illustrates an example of the entity mapping system determining distance scores for multi-word entities and tokenized character strings in accordance with one or more implementations.
Figure 12:
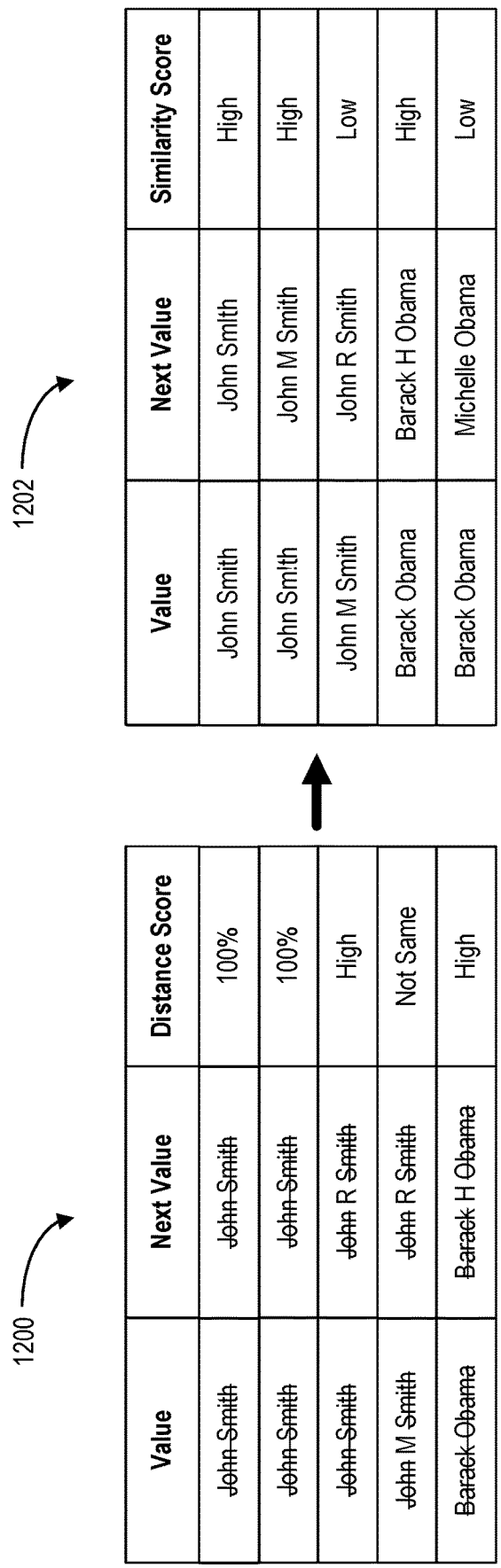
FIG. 12 illustrates an example of the entity mapping system determining similarity metrics for multi-word entities and tokenized character strings based on distance scores in accordance with one or more implementations.

According to one or more embodiments, the entity mapping system 102 determines entity pairs involving multi-word entities. FIGS. 11-12 illustrate examples of a process in which the entity mapping system 102 determines entity mappings for multi-word entities. Specifically, FIG. 11 illustrates the entity mapping system 102 identifying and comparing multi-word entities extracted from one or more digital text documents. FIG. 12 illustrates the entity mapping system 102 determining similarity scores for entity pairs involving multi-word entities.

In one or more embodiments, as illustrated in FIG. 11, the entity mapping system 102 determines an entity table 1100 including entities extracted from one or more digital text documents. For example, the entity mapping system 102 utilizes a named entity recognition model to extract the entities and generate the entity table 1100. Additionally, the entity mapping system 102 generates a modified entity table 1102 including multi-word entities by removing single-word entities from the entity table 1100. Accordingly, as illustrated, the entity mapping system 102 generates the modified entity table 1102 by removing entities such as "Illinois," "Virginia," and "Obama." In one or more embodiments, the entity mapping system 102 also sorts the modified entity table 1102 alphabetically.

In addition, the entity mapping system 102 determines distance scores between multi-word entities in the modified entity table 1102. Specifically, the entity mapping system 102 traverses the modified entity table 1102 to compare adjacent entries in the modified entity table 1102. To illustrate, the entity mapping system 102 determines a string distance between "Barack Obama" to "John Smith," "John Smith" to "John Sm!th," etc. In one or more embodiments, the entity mapping system 102 determines distance scores for each multi-word entity pair by calculating the Levenshtein distance between each multi-word entity in the multi-word entity pair, as illustrated in the comparison table 1104 of FIG. 11.

According to one or more embodiments, in response to determining multi-word entity pairs with high distance scores (e.g., meeting a threshold distance score), the entity mapping system 102 determines similarity scores for individual words in the multi-word entity pairs. Specifically, as illustrated in FIG. 11, the entity mapping system 102 determines a similarity table 1106 by comparing the individual words of the multi-word entity pairs to tokenized character strings from a tokenization table. To illustrate, the entity mapping system 102 compares "John" from "John Smith" to "John" and "JOhn" of a tokenization table to determine similarity scores for each. In one or more embodiments, the entity mapping system 102 leverages a previously generated similarity table, such as the similarity table described above with respect to FIG. 7, to quickly determine similarity scores for the entity-token pairs.

In response to determining similarity scores for the individual words of the multi-word entity pairs, the entity mapping system 102 replaces character strings in the multi-word entities with corresponding character strings from the tokenization table based on the similarity table. For instance, as illustrated in FIG. 11, the entity mapping system 102 generates a modified comparison table 1108 including multi-word entities by replacing "JOhn" with "John" according to the similarity table 1106. The entity mapping system 102 thus replaces character strings in multi-word entities including non-standard characters with equivalent character strings without the non-standard characters.

As previously mentioned, FIG. 12 illustrates a process in which the entity mapping system 102 generates similarity scores for multi-word entity pairs. In particular, the entity mapping system 102 determines an updated set of multi-word entity pairs in response to replacing individual words of the multi-word entity pairs, as shown in the entity pair table 1200 of FIG. 12. Additionally, the entity mapping system 102 determines common words between entities in a multi-word entity pair and removes the common words from the multi-word entity pair. For example, as shown, the entity mapping system 102 determines that "John Smith" and "John R Smith" have "John" and "Smith" in common. Accordingly, the entity mapping system 102 removes the common words, leaving "R" as the only character/string in the multi-word entity pair.

In addition to removing the common words, the entity mapping system 102 compares the remaining characters/words of each entity in a multi-word entity pair. Specifically, the entity mapping system 102 determines a distance score between the remaining words. To illustrate, for the above pair of "John Smith" and "John R Smith," the entity mapping system 102 determines a distance score for an empty string and "R," which results in a high distance score (e.g., a low Levenshtein distance). In response to determining that both strings are empty, the entity mapping system 102 determines a 100% match. Additionally, in one or more embodiments, in response to determining that the remaining words do not match (e.g., "M" in "John M Smith" and "R" in "John R Smith"), the entity mapping system 102 determines that the entities are not the same.

The entity mapping system 102 also determines a similarity score for each multi-word entity pair based on the corresponding distance score, as illustrated in the similarity table 1202 of FIG. 12. For instance, the entity mapping system 102 determines that "John Smith" is likely the same as "John R Smith" with a high similarity score (e.g., high correlation probability). Additionally, in some embodiments, the entity mapping system 102 provides one or more multi-word entity pairs for display at a client device for a user to provide feedback on whether to generate an entity mapping for the multi-word entity pairs. To illustrate, the entity mapping system 102 provides a multi-word entity pair for display in response to determining that the corresponding similarity score does not meet a particular threshold.

Figure 13:
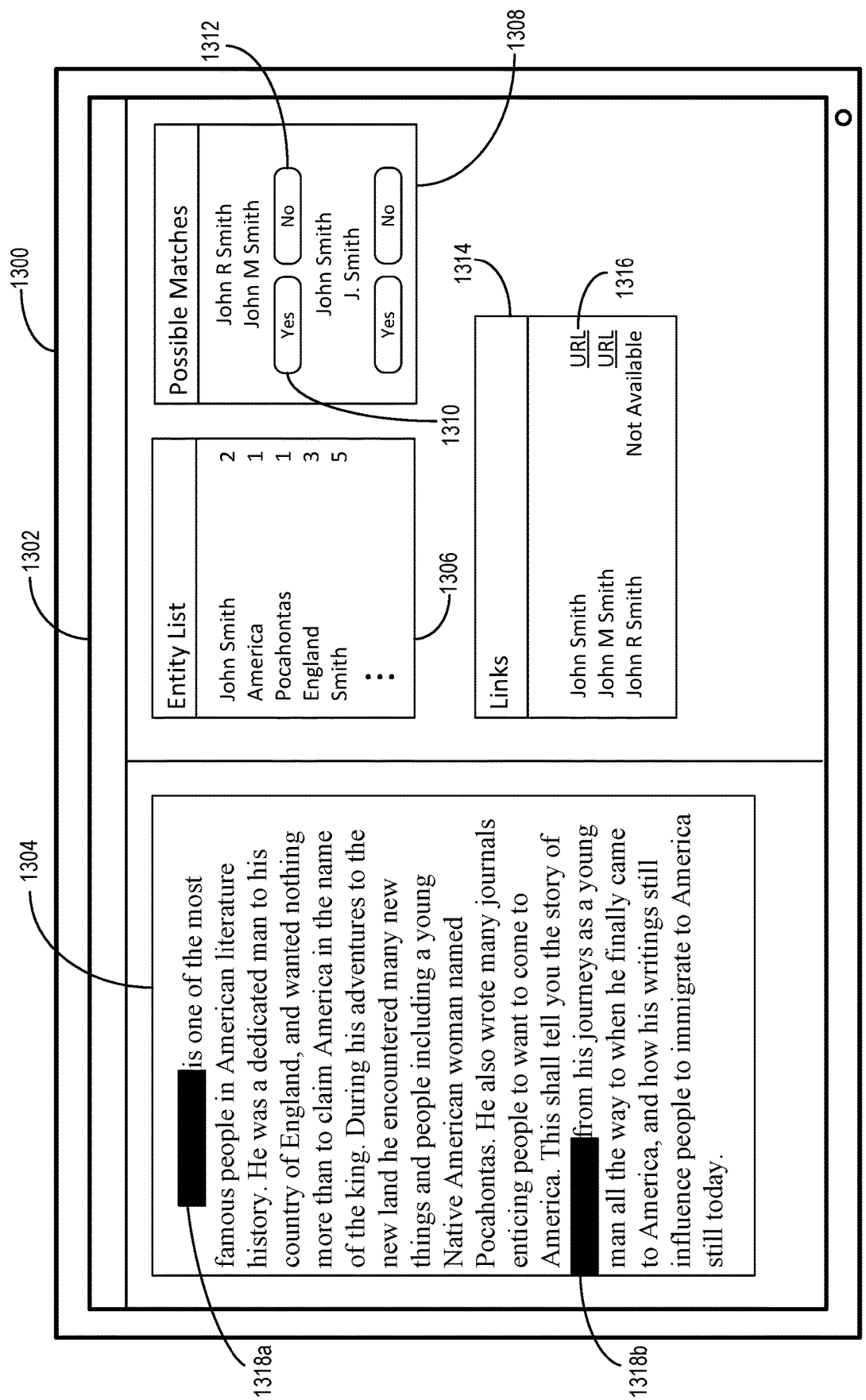
FIG. 13 illustrates an example graphical user interface for displaying entity mapping data in connection with digitizing digital text in accordance with one or more implementations.

FIG. 13 illustrates an example of a graphical user interface of a client device 1300 on which a client application 1302 operates in connection with digital text processing. For example, as illustrated, the client device 1300 displays a text portion 1304 of a digital text document. Additionally, the client device 1300 displays an entity list 1306 generated by the entity mapping system 102 in response to processing the digital text document. In one or more embodiments, the entity list 1306 includes entities after performing entity mapping between entities extracted by a named entity recognition model and tokens generated by a text tokenizer model according to similarity scores. In alternative embodiments, the client device 1300 displays extracted entities, entity-token pairs, and other information associated with the entity mapping process, such as distance scores, similarity scores, and possible matches.

According to one or more embodiments, the client device 1300 provides one or more entity-token pairs and/or multi-word entity pairs based on similarity scores. For instance, as illustrated, the entity mapping system 102 provides possible matches 1308 including one or more pairs of multi-word entities that may be the same along with one or more requests to verify mappings between entities and/or entity-token pairs. Additionally, the client device 1300 displays a confirmation element 1310 or a rejection element 1312 for a user of the client device 1300 to provide feedback regarding a particular entity pair (e.g., to verify or reject an entity mapping in a verification message to the entity mapping system 102). Furthermore, in one or more embodiments, the client device 1300 displays the possible matches 1308 including single-word entity-token pairs (e.g., "Illinois" and "!llinOis") for verification by the user.

In one or more embodiments, the client device 1300 also displays additional information associated with one or more entities, entity-token pairs, or multi-word entity pairs to assist the user in providing feedback and/or learning more about a particular entity. Specifically, FIG. 13 illustrates that the client device 1300 displays a link section 1314 in which the entity mapping system 102 obtains and provides links to additional information associated with unique values of entities from the entity list 1306 or from the possible matches 1308. To illustrate, the client device 1300 displays a uniform resource locator 1316 associated with a particular entity that redirects to a webpage including additional information about the entity. In some embodiments, the uniform resource locator 1316 redirects to data stored in an entity mapping repository, such as possible correlations for the entity or existing entity mappings including the entity.

According to one or more embodiments, in connection with utilizing user feedback to generate or modify entity mappings (or correlation probabilities) associated with entity pairs or entity-token pairs, the entity mapping system 102 also provides fast and efficient digital text modifications based on user feedback. For instance, in response to receiving user feedback to generate an entity mapping between two different entities or an entity and a token, the entity mapping system 102 automatically determines the locations of the entities/tokens and replaces the entities/tokens with the matching entity. To illustrate, the entity mapping system 102 determines a location of an entity or character string based on a corresponding token including a first character position within a digital text document. The entity mapping system 102 replaces the entity or character string with the selected entity, such as by removing the entity/character string and inserting the matching entity into the same location. The entity mapping system 102, by generating and using the tokens with encoded location information, is able to make modifications like replacing all instances of entity/character strings without having to reparse the document(s). Thus, the entity mapping system 102 improves conventional computing devices by allowing them to replace entity/character strings in a faster and more efficient manner. The client device 1300 can display the updated the text portion 1304 including the replaced text based on the entity mapping.

In one or more embodiments, the entity mapping system 102 also performs additional operations in connection with entity mappings. In particular, the entity mapping system 102 provides automatic redaction or masking operations to modify text based on a selected entity mapping. For example, the client device 1300 displays an option to redact or mask (or otherwise edit) one or more entities within a digital text document in connection with an entity mapping or in connection with other interactions via the client device (e.g., a mouse click on a recognized entity in the text portion 1304 or the entity list 1306).

In response to a selection to redact or mask an entity (e.g., "John Smith") in the text portion 1304 (or a full digital text document or a plurality of digital text documents), the entity mapping system 102 accesses an entity mapping for the entity to determine one or more entities or character strings. Additionally, the entity mapping system 102 determines positions of instances of the entities/character strings and redacts/masks the selected instances throughout the digital text document by placing digital ink or otherwise hiding the entities/character strings. To illustrate, in response to a selection to redact instances of the entity "John Smith" in the digital text document, the entity mapping system 102 accesses one or more entity mappings to find all instances of the entity and insert a mask (e.g., a first mask 1318a and a second mask 1318b). More specifically, the entity mapping system 102 accesses the position information (e.g., pointers to the first characters) from the tokens corresponding to the character strings and redacts the character strings at the identified positions by inserting the masks to cover all characters in the corresponding character strings. Once again, by generating and using the tokens with encoded location information, is able to make modifications like masking all instances of entity/character strings without having to reparse the document(s). Thus, the entity mapping system 102 improves conventional computing devices by allowing them to mask entity/character strings in a faster and more efficient manner.

Figure 14:
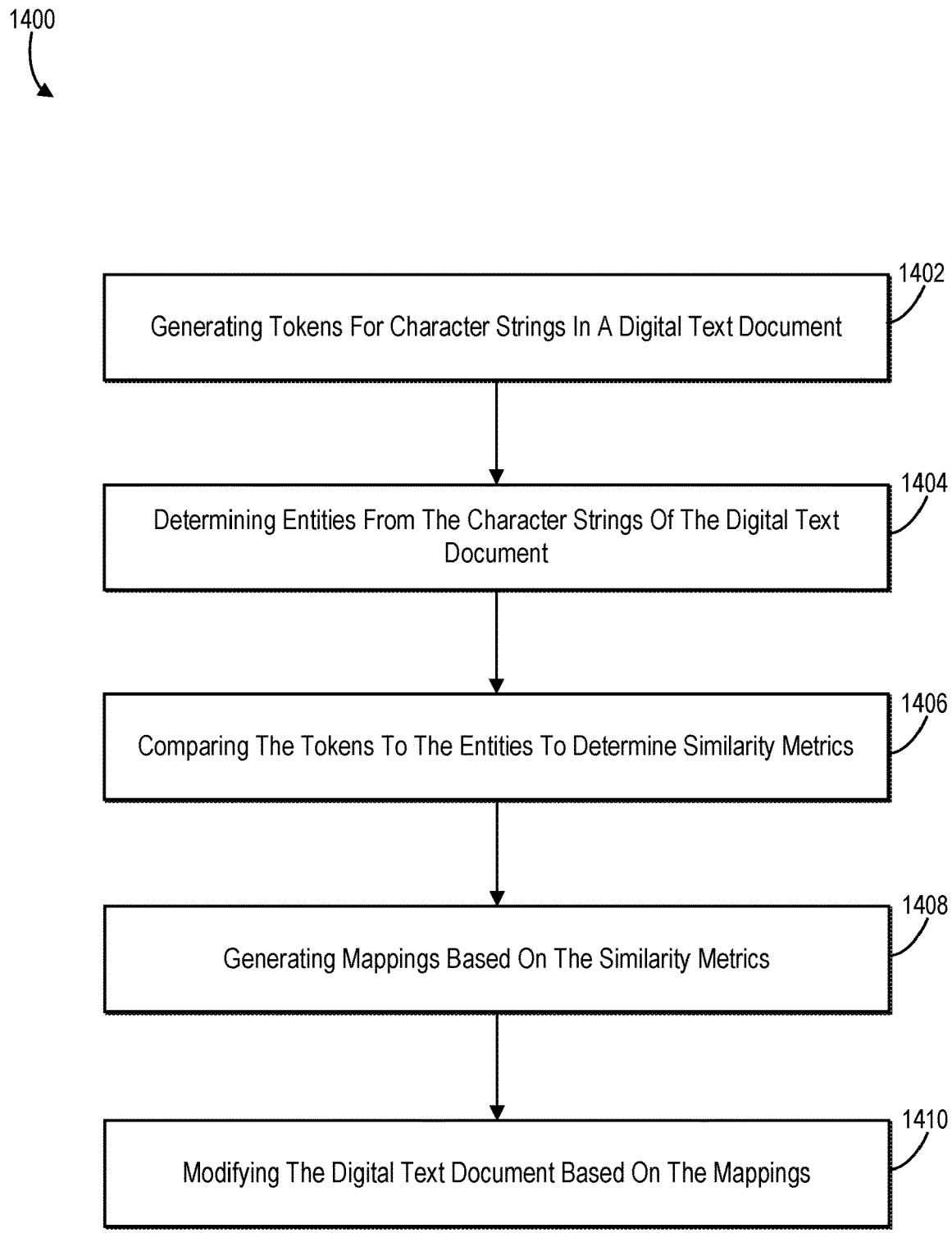
FIG. 14 illustrates an example flowchart of a series of acts for modifying digital text documents based on mappings of text entities to character string tokens in accordance with one or more implementations.

Turning now to FIG. 14, this figure shows a flowchart of a series of acts 1400 of clustering digital documents using document signatures. While FIG. 14 illustrates acts according to one embodiment, alternative embodiments may omit, add to, reorder, and/or modify any of the acts shown in FIG. 14. The acts of FIG. 14 can be performed as part of a method. Alternatively, a non-transitory computer readable medium can comprise instructions, that when executed by one or more processors, cause a computing device to perform the acts of FIG. 14. In still further embodiments, a system can perform the acts of FIG. 14.

As illustrated in FIG. 14, the series of acts 1400 includes an act 1402 of generating tokens for character strings in a digital text document. For example, act 1402 involves generating, from a digital text document, tokens for a plurality of character strings based on character positions of the plurality of character strings within the digital text document. Act 1402 can involve generating, for a character string, a token comprising the character string, a final character value of the character string, and a first character position of the character string within the digital text document. For instance, act 1402 can involve determining a final character value of a character string of the plurality of character strings. Act 1402 can involve determining a first character position of the character string within the digital text document. Act 1402 can also involve combining the character string, the final character value, and the first character position into a token. Act 1402 can also involve inserting the token with the character string, the final character value, and the first character position into a tokenization table. In one or more embodiments, the entity mapping system 102 performs the operations of act 1402, as described in relation to FIGS. 3 and 6.

The series of acts 1400 also includes an act 1404 of determining entities from the character strings of the digital text document. For example, act 1404 involves determining, utilizing a named entity recognition model, a plurality of entities from the plurality of character strings of the digital text document. Act 1404 can involve generating an entity table including entities extracted from the digital text document. Act 1404 can also involve extracting the plurality of entities by utilizing the named entity recognition model to process unstructured text data. In one or more embodiments, the entity mapping system 102 performs the operations of act 1404, as described in relation to FIGS. 3 and 5.

Additionally, the series of acts 1400 includes an act 1406 of comparing the tokens to the entities to determine similarity metrics. For example, act 1406 involves comparing the tokens to a plurality of entities extracted from the plurality of character strings to determine a plurality of similarity metrics between the tokens and the plurality of entities. Act 1406 can involve determining string distances between an entity of the plurality of entities and a sorted subset of the plurality of character strings according to the tokens. For example, act 1406 can involve determining a sorted subset of the plurality of character strings according to an alphabetical order of the plurality of character strings. In one or more embodiments, the entity mapping system 102 performs the operations of act 1406, as described in relation to FIGS. 3, 7, and 8.

Act 1406 can also involve determining correlation probability values associated with the entity and the sorted subset of the plurality of character strings based on the string distances. For example, act 1406 can involve determining string distances between an entity of the plurality of entities and a plurality of adjacent character strings in the sorted subset of the plurality of character strings based on an alphabetical position of the entity relative to the sorted subset of the plurality of character strings. Act 1406 can involve determining correlation probability values associated with the entity and each adjacent character string of the sorted subset of the plurality of character strings based on the string distances.

Act 1406 can involve determining a character string of the plurality of character strings comprising at least one non-standard character. Act 1406 can involve removing the at least one non-standard character from the character string and a corresponding character from the entity. Act 1406 can also involve determining an updated string distance between the entity and the character string.

Act 1406 can involve comparing a similarity metric between a token and an entity to a stored similarity metric within an entity mapping repository. Act 1406 can also involve updating the similarity metric between the token and the entity according to the entity mapping repository.

The series of acts 1400 further includes an act 1408 of generating mappings based on the similarity metrics. For example, act 1408 involves generating mappings between the tokens and the plurality of entities based on the plurality of similarity metrics. For example, act 1408 can involve selecting, for an entity, a token corresponding to a character string based on a similarity metric for the character string relative to an entity of the plurality of entities. Act 1408 can also involve generating a mapping between the token and the entity within an entity mapping repository. In one or more embodiments, the entity mapping system 102 performs the operations of act 1408, as described in relation to FIGS. 2, 3, and 9.

Act 1408 can involve determining that a similarity metric for a character string of a token and to an entity of the plurality of entities meets a threshold similarity metric. Act 1408 can also involve generating a mapping between the token and the entity within an entity mapping repository in response to determining that the similarity metric meets the threshold similarity metric.

Act 1408 can involve determining that a similarity metric between a token and an entity does not meet a threshold similarity metric. Act 1408 can involve providing, for display via a client device, a request to verify a mapping between the token and the entity. Act 1408 can also involve generating the mapping between the token and the entity in response to a verification message.

The series of acts 1400 also includes an act 1410 of modifying the digital text document based on the mappings. For example, act 1410 involves modifying the digital text document based on the mappings between the tokens and the plurality of entities. In one or more embodiments, the entity mapping system 102 performs the operations of act 1410, as described in relation to FIGS. 2 and 13.

Act 1410 can involve accessing, in response to a request to modify an entity in the digital text document, one or more entity mappings between the entity and one or more additional entities or one or more tokens. For example, act 1410 can involve accessing, in response to a request to redact an entity from the digital text document, a mapping between the entity and a token. Act 1410 can also involve modifying the entity and the one or more additional entities or the one or more tokens based on the one or more entity mappings. For example, act 1410 can involve removing one or more character strings corresponding to the token from the digital text document based on the mapping between the entity and the token.

Act 1410 can involve receiving a request to modify instances of the entity within the digital text document. Act 1410 can also involve modifying, in response to the request, one or more character strings in the digital text document based on the mapping between the token and the entity within the entity mapping repository.

In one or more embodiments, the series of acts 1400 includes accessing, in response to a request to modify instances of the entity in the digital text document, the mapping between the token and the entity. The series of acts 1400 can also include modifying, within the digital text document, the character string corresponding to the token based on the mapping between the token and the entity.

The series of acts 1400 can also include determining a sorted entity list comprising a plurality of multi-word entities from the plurality of character strings in the digital text document. The series of acts 1400 can include determining string distances between adjacent multi-word entities in the sorted entity list. For example, the series of acts 1400 can include removing common words in a first multi-word entity and a second multi-word entity adjacent to the first multi-word entity in the sorted entity list. The series of acts 1400 can also include determining a string distance between the first multi-word entity and the second multi-word entity with the common words removed. The series of acts 1400 can also include determining a plurality of additional similarity metrics between the adjacent multi-word entities in the sorted entity list based on the string distances. For instance, the series of acts 1400 can include determining a similarity metric between the first multi-word entity and the second multi-word entity based on the string distance.

Figure 15:
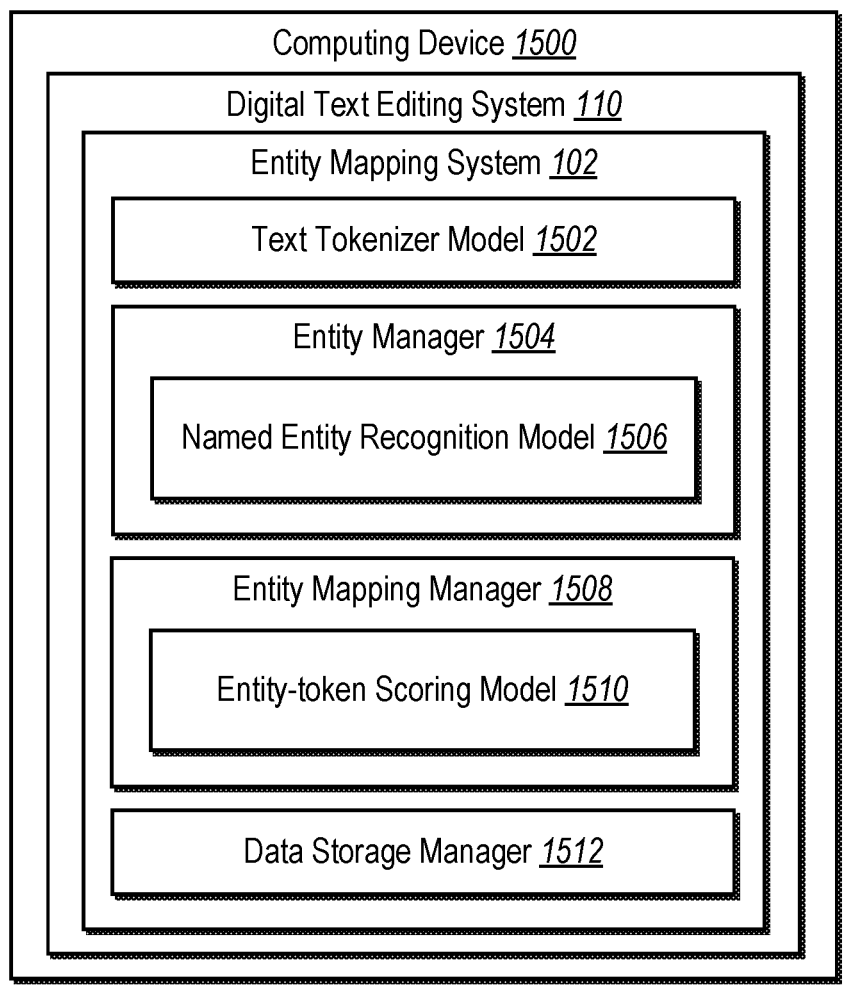
FIG. 15 illustrates a diagram of the entity mapping system of FIG. 1 in accordance with one or more implementations.

FIG. 15 illustrates a detailed schematic diagram of an embodiment of the entity mapping system 102 described above. As shown, the entity mapping system 102 is implemented in a digital text editing system 110 on computing device(s) 1500 (e.g., a client device and/or server device as described in FIG. 1, and as further described below in relation to FIG. 15). Additionally, the entity mapping system 102 includes, but is not limited to, a text tokenizer model 1502, an entity manager 1504 including a named entity recognition model 1506, an entity mapping manager 1508 including an entity-token scoring model 1510, and a data storage manager 1512. The entity mapping system 102 can be implemented on any number of computing devices. For example, the entity mapping system 102 can be implemented in a distributed system of server devices for processing digital text. The entity mapping system 102 can also be implemented within one or more additional systems. Alternatively, the entity mapping system 102 can be implemented on a single computing device such as a single client device.

In one or more embodiments, each of the components of the entity mapping system 102 is in communication with other components using any suitable communication technologies. Additionally, the components of the entity mapping system 102 are capable of being in communication with one or more other devices including other computing devices of a user, server devices (e.g., cloud storage devices), licensing servers, or other devices/systems. It will be recognized that although the components of the entity mapping system 102 are shown to be separate in FIG. 15, any of the subcomponents may be combined into fewer components, such as into a single component, or divided into more components as may serve a particular implementation. Furthermore, although the components of FIG. 15 are described in connection with the entity mapping system 102, at least some of the components for performing operations in conjunction with the entity mapping system 102 described herein may be implemented on other devices within the environment.

In some embodiments, the components of the entity mapping system 102 include software, hardware, or both. For example, the components of the entity mapping system 102 include one or more instructions stored on a computer-readable storage medium and executable by processors of one or more computing devices (e.g., the computing device(s) 1500). When executed by the one or more processors, the computer-executable instructions of the entity mapping system 102 cause the computing device(s) 1500 to perform the operations described herein. Alternatively, the components of the entity mapping system 102 can include hardware, such as a special purpose processing device to perform a certain function or group of functions. Additionally, or alternatively, the components of the entity mapping system 102 can include a combination of computer-executable instructions and hardware.

Furthermore, the components of the entity mapping system 102 performing the functions described herein with respect to the entity mapping system 102 may, for example, be implemented as part of a stand-alone application, as a module of an application, as a plug-in for applications, as a library function or functions that may be called by other applications, and/or as a cloud-computing model. Thus, the components of the entity mapping system 102 may be implemented as part of a stand-alone application on a personal computing device or a mobile device. Alternatively, or additionally, the components of the entity mapping system 102 may be implemented in any application that provides digital text processing.

The entity mapping system 102 includes a text tokenizer model 1502 to generate and manage tokens for character strings in digital text. For example, the text tokenizer model 1502 converts character strings (e.g., words) in digital text into tokens based on attributes of the character strings. In one or more embodiments, the text tokenizer model 1502 utilizes a natural language processing model to identify separate character strings. Alternatively, the text tokenizer model 1502 parses and tokenizes text based on character values, spaces, and punctuation.

The entity mapping system 102 includes an entity manager 1504 to extract and manage entities in digital text. For example, the entity manager 1504 utilizes a named entity recognition model 1506 to extract entities from a plurality of digital text documents. In one or more embodiments, the entity manager 1504 utilizes the named entity recognition model 1506 to extract entities related to one or more categories (e.g., based on training of the named entity recognition model 1506).

The entity mapping system 102 also includes an entity mapping manager 1508 to generate entity mappings for entity-token pairs in digital text. Specifically, the entity mapping manager 1508 utilizes an entity-token scoring model 1510 to communicate with the text tokenizer model 1502 and the entity manager 1504 to determine distance scores and similarity scores for entity-token pairs in digital text. Additionally, in some embodiments, the entity mapping manager 1508 utilizes user feedback and an entity mapping repository to improve accuracy of entity mappings.

The entity mapping system 102 also includes a data storage manager 1512 (that comprises a non-transitory computer memory/one or more memory devices) that stores and maintains data associated with digital text processing. For example, the data storage manager 1512 stores data associated with extracting entities and tokenizing text. To illustrate, the data storage manager 1512 stores natural language processing models, machine-learning models, entities, tokens, distance scores, similarity scores, entity mappings, and user feedback in connection with processing digital text documents.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 16:
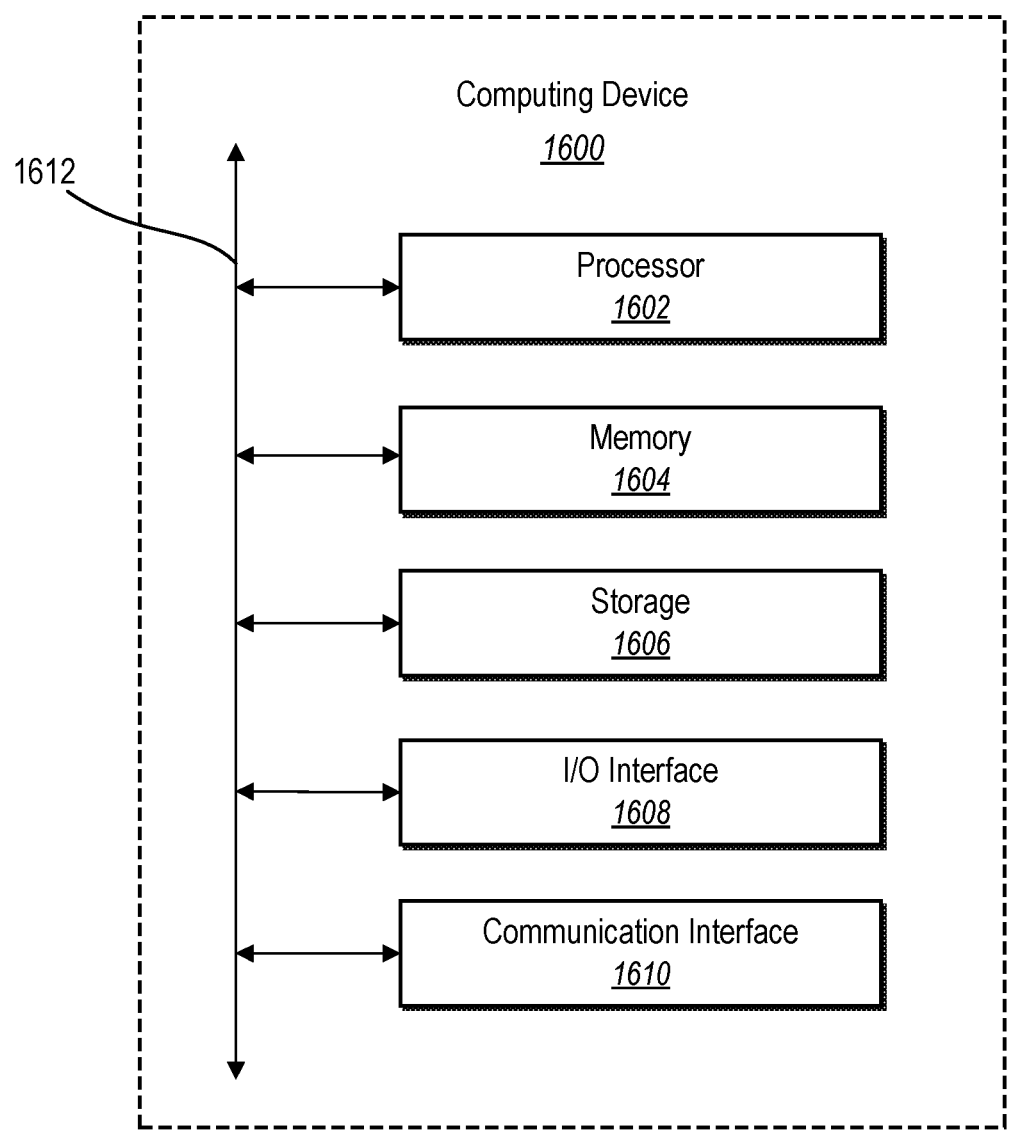
FIG. 16 illustrates a block diagram of an exemplary computing device in accordance with one or more embodiments.

FIG. 16 illustrates a block diagram of exemplary computing device 1600 that may be configured to perform one or more of the processes described above. One will appreciate that one or more computing devices such as the computing device 1600 may implement the system(s) of FIG. 1. As shown by FIG. 16, the computing device 1600 can comprise a processor 1602, a memory 1604, a storage device 1606, an I/O interface 1608, and a communication interface 1610, which may be communicatively coupled by way of a communication infrastructure 1612. In certain embodiments, the computing device 1600 can include fewer or more components than those shown in FIG. 16. Components of the computing device 1600 shown in FIG. 16 will now be described in additional detail.

In one or more embodiments, the processor 1602 includes hardware for executing instructions, such as those making up a computer program. As an example, and not by way of limitation, to execute instructions for dynamically modifying workflows, the processor 1602 may retrieve (or fetch) the instructions from an internal register, an internal cache, the memory 1604, or the storage device 1606 and decode and execute them. The memory 1604 may be a volatile or non-volatile memory used for storing data, metadata, and programs for execution by the processor(s). The storage device 1606 includes storage, such as a hard disk, flash disk drive, or other digital storage device, for storing data or instructions for performing the methods described herein.

The I/O interface 1608 allows a user to provide input to, receive output from, and otherwise transfer data to and receive data from computing device 1600. The I/O interface 1608 may include a mouse, a keypad or a keyboard, a touch screen, a camera, an optical scanner, network interface, modem, other known I/O devices or a combination of such I/O interfaces. The I/O interface 1608 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1608 is configured to provide graphical data to a display for presentation to a user. The graphical data may be representative of one or more graphical user interfaces and/or any other graphical content as may serve a particular implementation.

The communication interface 1610 can include hardware, software, or both. In any event, the communication interface 1610 can provide one or more interfaces for communication (such as, for example, packet-based communication) between the computing device 1600 and one or more other computing devices or networks. As an example, and not by way of limitation, the communication interface 1610 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 1610 may facilitate communications with various types of wired or wireless networks. The communication interface 1610 may also facilitate communications using various communication protocols. The communication infrastructure 1612 may also include hardware, software, or both that couples components of the computing device 1600 to each other. For example, the communication interface 1610 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A computer-implemented method comprising:
   generating, from a digital text document, tokens for a plurality of character strings including character positions of the plurality of character strings within the digital text document and final character values of the plurality of character strings as values separate from the plurality of character strings, the final character values comprising alphabetical characters;

comparing the tokens to a plurality of entities extracted from the plurality of character strings to determine a plurality of similarity metrics between the tokens and the plurality of entities;

generating mappings between the tokens and the plurality of entities based on the plurality of similarity metrics; and modifying the digital text document based on the mappings between the tokens and the plurality of entities.

2. The computer-implemented method as recited in claim 1, wherein generating the tokens for the plurality of character strings comprises generating, for a character string, a token comprising the character string, a final character value of the character string, and a first character position of the character string within the digital text document.

3. The computer-implemented method as recited in claim 1, wherein comparing the tokens to the plurality of entities comprises:

determining the plurality of entities from the plurality of character strings utilizing a named entity recognition model;

determining string distances between an entity of the plurality of entities and a sorted subset of the plurality of character strings according to the tokens; and determining correlation probability values associated with the entity and the sorted subset of the plurality of character strings based on the string distances.

4. The computer-implemented method as recited in claim 3, wherein determining the string distances between the entity of the plurality of entities and the sorted subset of the plurality of character strings comprises:

determining a character string of the plurality of character strings comprising at least one non-standard character;

removing the at least one non-standard character from the character string and a corresponding character from the entity; and determining an updated string distance between the entity and the character string.

5. The computer-implemented method as recited in claim 1, wherein generating the mappings comprises:

selecting, for an entity, a token corresponding to a character string based on a similarity metric for the character string relative to an entity of the plurality of entities; and generating a mapping between the token and the entity within an entity mapping repository.

6. The computer-implemented method as recited in claim 5, further comprising:

accessing, in response to a request to modify instances of the entity in the digital text document, the mapping between the token and the entity; and modifying, within the digital text document, the character string corresponding to the token based on the mapping between the token and the entity.

7. The computer-implemented method as recited in claim 1, further comprising:

determining a sorted entity list comprising a plurality of multi-word entities from the plurality of character strings in the digital text document;

determining string distances between adjacent multi-word entities in the sorted entity list; and determining a plurality of additional similarity metrics between the adjacent multi-word entities in the sorted entity list based on the string distances.

8. The computer-implemented method as recited in claim 7, wherein determining the string distances between the adjacent multi-word entities in the sorted entity list comprises:

removing common words in a first multi-word entity and a second multi-word entity adjacent to the first multi-word entity in the sorted entity list; and determining a string distance between the first multi-word entity and the second multi-word entity with the common words removed.

9. The computer-implemented method as recited in claim 1, further comprising:

determining that a similarity metric between a token and an entity does not meet a threshold similarity metric;

providing, for display via a client device, a request to verify a mapping between the token and the entity; and generating the mapping between the token and the entity in response to a verification message.

10. The computer-implemented method as recited in claim 1, wherein comparing the tokens to the plurality of entities comprises:

comparing a similarity metric between a token and an entity to a stored similarity metric within an entity mapping repository; and updating the similarity metric between the token and the entity according to the entity mapping repository.

11. The computer-implemented method as recited in claim 1, wherein modifying the digital text document comprises:

accessing, in response to a request to modify an entity in the digital text document, one or more entity mappings between the entity and one or more additional entities or one or more tokens; and modifying the entity and the one or more additional entities or the one or more tokens based on the one or more entity mappings.

12. A system comprising:

one or more processors configured to cause the system to:

generate, from a digital text document, tokens for a plurality of character strings including character positions of the plurality of character strings within the digital text document and final character values of the plurality of character strings as values separate from the plurality of character strings, the final character values comprising alphabetical characters;

determine, utilizing a named entity recognition model, a plurality of entities from the plurality of character strings of the digital text document;

compare the tokens to a plurality of entities extracted from the plurality of character strings to determine a plurality of similarity metrics between the tokens and the plurality of entities;

generate mappings between the tokens and the plurality of entities based on the plurality of similarity metrics; and modify the digital text document based on the mappings between the tokens and the plurality of entities.

13. The system as recited in claim 12, wherein the one or more processors are further configured to generate the tokens for the plurality of character strings by:

determining a final character value of a character string of the plurality of character strings;

determining a first character position of the character string within the digital text document; and combining the character string, the final character value, and the first character position into a token.

14. The system as recited in claim 12, wherein the one or more processors are further configured to compare the tokens to the plurality of entities by:
- determining the plurality of entities from the plurality of character strings utilizing a named entity recognition model;
- determining a sorted subset of the plurality of character strings according to an alphabetical order of the plurality of character strings;
- determining string distances between an entity of the plurality of entities and the sorted subset of the plurality of character strings; and
- determining correlation probability values associated with the entity and the sorted subset of the plurality of character strings based on the string distances.

15. The system as recited in claim 12, wherein the one or more processors are further configured to:
- generate the mappings by:
  - determining, for an entity, a token corresponding to a character string based on a similarity metric for the character string relative to an entity of the plurality of entities; and
  - generating a mapping between the token and the entity within an entity mapping repository; and
- modify the digital text document by:
  - receiving a request to modify instances of the entity within the digital text document; and
  - modifying, in response to the request, one or more character strings in the digital text document based on the mapping between the token and the entity within the entity mapping repository.

16. The system as recited in claim 12, wherein the one or more processors are further configured to:
- determine a sorted entity list comprising a first multi-word entity and a second multi-word entity from the plurality of character strings in the digital text document;
- determine a string distance between the first multi-word entity and the second multi-word entity with common words of the first multi-word entity and the second multi-word entity removed; and
- determine a similarity metric between the first multi-word entity and the second multi-word entity based on the string distance.

17. A non-transitory computer readable storage medium comprising instructions that, when executed by at least one processor, cause a computing device to perform operations comprising:
- generate, from a digital text document, tokens for a plurality of character strings including character positions of the plurality of character strings within the digital text document and final character values of the plurality of character strings as values separate from the plurality of character strings, the final character values comprising alphabetical characters;
- determine, utilizing a named entity recognition model, a plurality of entities from the plurality of character strings of the digital text document;
- compare the tokens to a plurality of entities extracted from the plurality of character strings to determine a plurality of similarity metrics between the tokens and the plurality of entities;
- generate mappings between the tokens and the plurality of entities based on the plurality of similarity metrics; and
- modify the digital text document based on the mappings between the tokens and the plurality of entities.

18. The non-transitory computer readable storage medium as recited in claim 17, wherein comparing the tokens to the plurality of entities comprises:
- determining a sorted subset of the plurality of character strings according to an alphabetical order of the plurality of character strings;
- determining string distances between an entity of the plurality of entities and a plurality of adjacent character strings in the sorted subset of the plurality of character strings based on an alphabetical position of the entity relative to the sorted subset of the plurality of character strings; and
- determining correlation probability values associated with the entity and each adjacent character string of the sorted subset of the plurality of character strings based on the string distances.

19. The non-transitory computer readable storage medium as recited in claim 17, wherein generating the mappings comprises:
- determining that a similarity metric for a character string of a token and to an entity of the plurality of entities meets a threshold similarity metric; and
- generating a mapping between the token and the entity within an entity mapping repository in response to determining that the similarity metric meets the threshold similarity metric.

20. The non-transitory computer readable storage medium as recited in claim 17, wherein modifying the digital text document comprises:
- accessing, in response to a request to redact an entity from the digital text document, a mapping between the entity and a token; and
- removing one or more character strings corresponding to the token from the digital text document based on the mapping between the entity and the token.

* * * * *